US012593252B2

(12) United States Patent
Yu et al.

(10) Patent No.: US 12,593,252 B2
(45) Date of Patent: Mar. 31, 2026

(54) METHOD AND DEVICE USED IN COMMUNICATION NODE FOR WIRELESS COMMUNICATION

(71) Applicant: Apogee Networks, LLC, Dallas, TX (US)

(72) Inventors: Qiaoling Yu, Shanghai (CN); Xiaobo Zhang, Shanghai (CN)

(73) Assignee: Apogee Networks, LLC, Dallas, TX (US)

( * ) Notice: Subject to any disclaimer, the term of this patent is extended or adjusted under 35 U.S.C. 154(b) by 317 days.

(21) Appl. No.: 18/080,764

(22) Filed: Dec. 14, 2022

(65) Prior Publication Data

US 2023/0217324 A1 Jul. 6, 2023

(30) Foreign Application Priority Data

Dec. 31, 2021 (CN) .......................... 202111661442.7

(51) Int. Cl.
*H04W 36/00* (2009.01)

(52) U.S. Cl.
CPC ... *H04W 36/0061* (2013.01); *H04W 36/0072* (2013.01)

(58) Field of Classification Search
None
See application file for complete search history.

(56) References Cited

U.S. PATENT DOCUMENTS

| | | |
|---|---|---|
| 11,350,328 B2 | 5/2022 | Lee et al. |
| 12,058,758 B2 | 8/2024 | Yang |
| 12,096,295 B2 | 9/2024 | da Silva et al. |

(Continued)

FOREIGN PATENT DOCUMENTS

CN 102651894 A 8/2012

OTHER PUBLICATIONS

Third Generation Partnership Project, "Technical Specification Group Radio Access Network; Evolved Universal Terrestrial Radio Access (E-UTRA); Radio Resource Control (RRC); Protocol specification (Release 16)," 3GPP TS 36.331 V16.7.0 (Dec. 2021).

(Continued)

*Primary Examiner* — Robert M Morlan
(74) *Attorney, Agent, or Firm* — Volpe Koenig

(57) ABSTRACT

The present application discloses a method and a device used in a communication node for wireless communications. The communication node receives a first signaling, the first signaling being used for indicating at least a first target cell and a second target cell; and performs a first handshake process for the first target cell; and performs a second handshake process for the second target cell; and determines whether to initiate an RRC connection re-establishment procedure according to whether at least one of the first handshake process or the second handshake process is successfully completed; neither the first handshake process nor the second handshake process being successfully completed is used to determine to initiate the RRC connection re-establishment procedure; either the first handshake process or the second handshake process being successfully completed is used to determine not to initiate the RRC connection re-establishment procedure.

20 Claims, 8 Drawing Sheets

(56)                     References Cited

U.S. PATENT DOCUMENTS

| | | | | |
|---|---|---|---|---|
| 2011/0053595 A1* | 3/2011 | Snow | .................. | H04W 76/19 |
| | | | | 455/436 |
| 2023/0156844 A1* | 5/2023 | Chen | ................ | H04W 36/0079 |
| | | | | 455/436 |

OTHER PUBLICATIONS

Third Generation Partnership Project, "Technical Specification Group Radio Access Network; NR; Multiplexing and channel coding (Release 16)," 3GPP TS 38.212 V16.8.0 (Dec. 2021).

Third Generation Partnership Project, "Technical Specification Group Radio Access Network; NR; Physical layer procedures for control (Release 16)," 3GPP TS 38.213 V16.7.0 (Sep. 2021).

Third Generation Partnership Project, "Technical Specification Group Radio Access Network; NR; Physical layer procedures for data (Release 16)," 3GPP TS 38.214 V16.7.0 (Sep. 2021).

Third Generation Partnership Project, "Technical Specification Group Radio Access Network; NR; NR and NG-RAN Overall Description; Stage 2 (Release 16)," 3GPP TS 38.300 V16.8.0 (Dec. 2021).

Third Generation Partnership Project, "Technical Specification Group Radio Access Network; NR; Medium Access Control (MAC) protocol specification (Release 16)," 3GPP TS 38.321 V16.7.0 (Dec. 2021).

Third Generation Partnership Project, "Technical Specification Group Radio Access Network; NR; Radio Resource Control (RRC) protocol specification (Release 16)," 3GPP TS 38.331 V16.7.0 (Dec. 2021).

Third Generation Partnership Project, "Technical Specification Group Radio Access Network; NG-RAN; Xn application protocol (XnAP) (Release 16)," 3GPP TS 38.423 V16.8.0 (Dec. 2021).

* cited by examiner

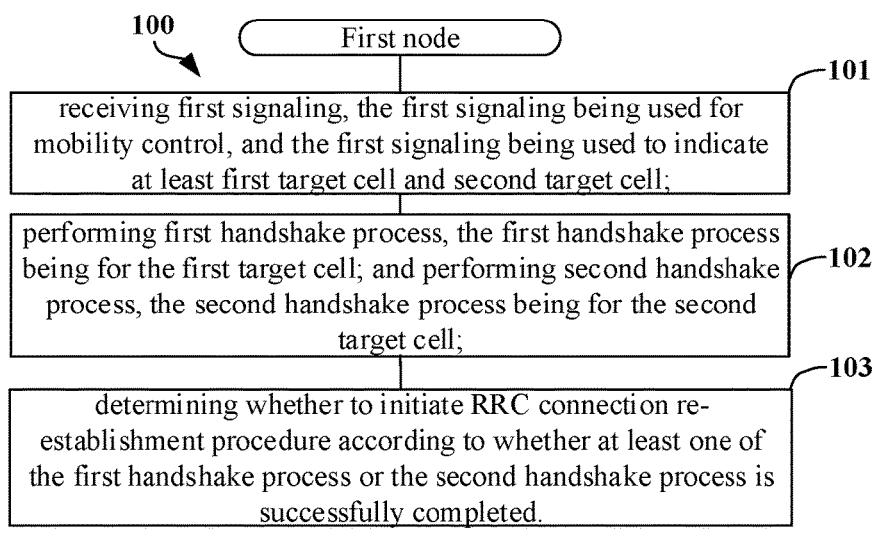

100

First node

101 receiving first signaling, the first signaling being used for mobility control, and the first signaling being used to indicate at least first target cell and second target cell;

102 performing first handshake process, the first handshake process being for the first target cell; and performing second handshake process, the second handshake process being for the second target cell;

103 determining whether to initiate RRC connection re-establishment procedure according to whether at least one of the first handshake process or the second handshake process is successfully completed.

FIG. 1

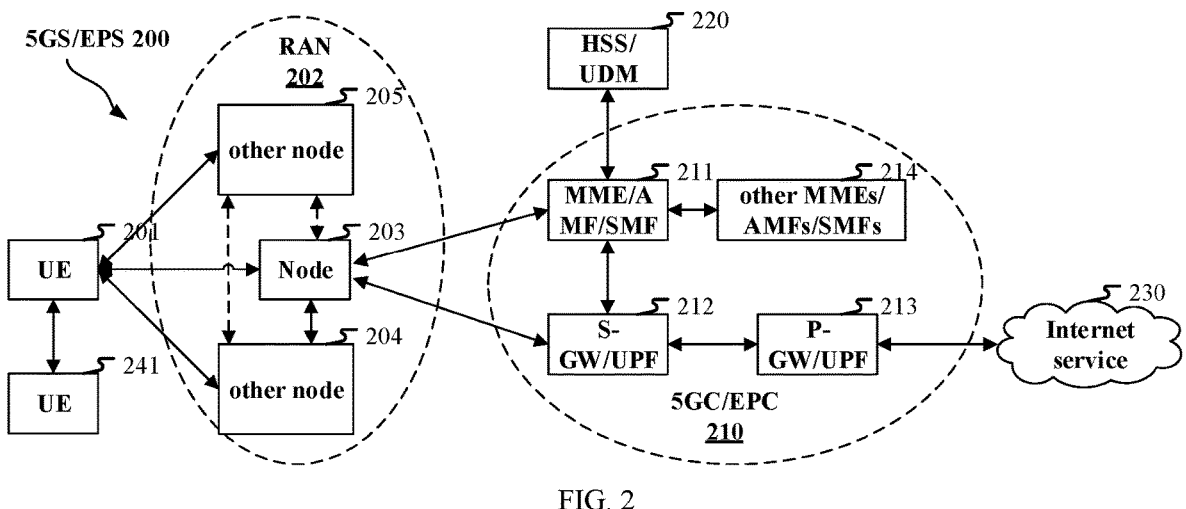

FIG. 2

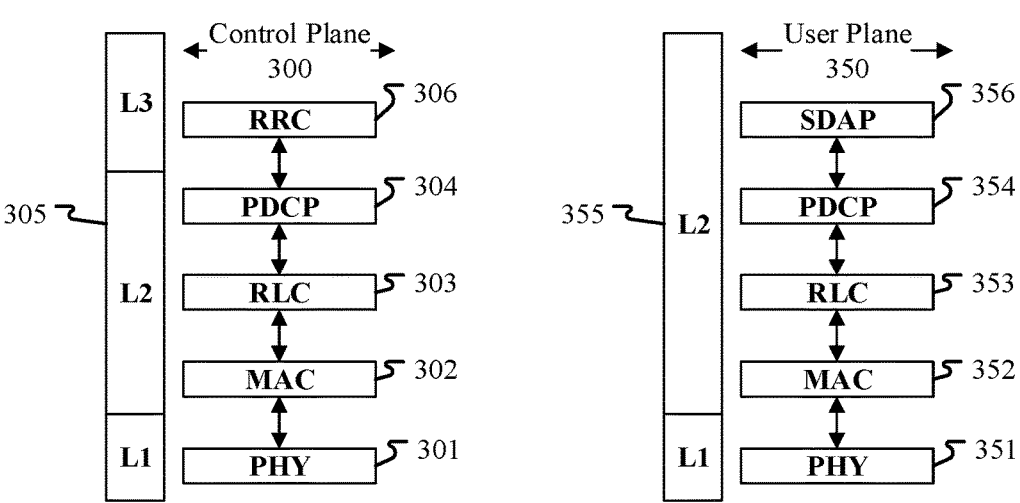

FIG. 3

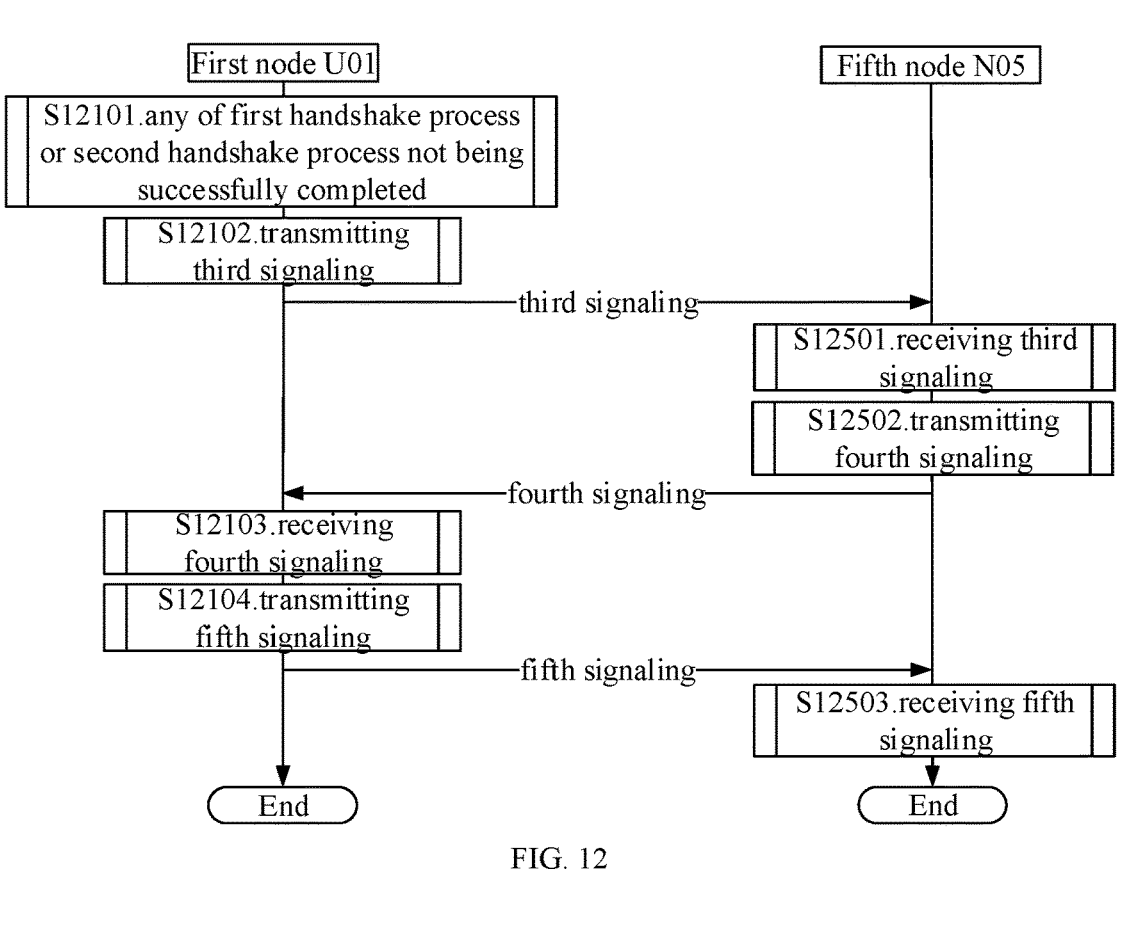
FIG. 12
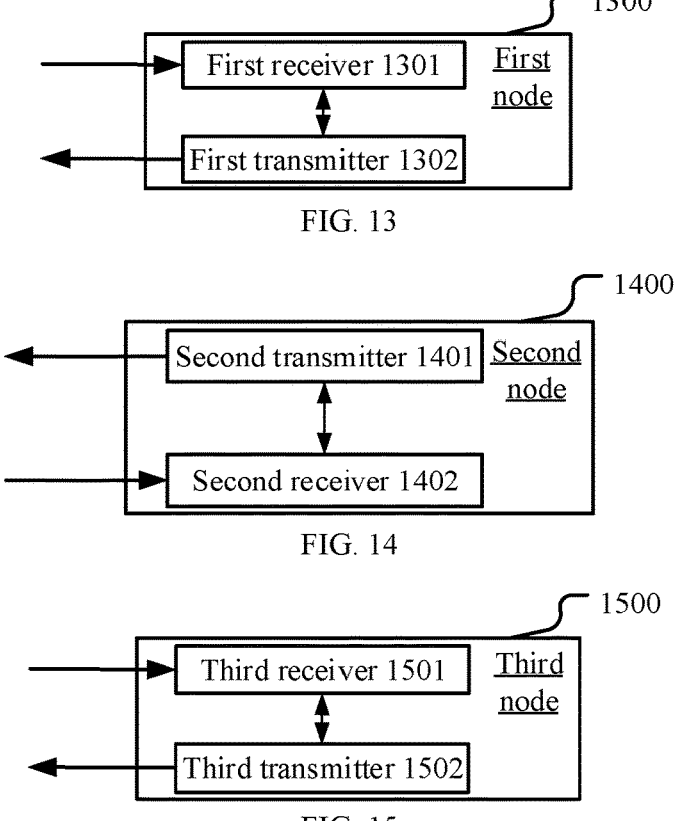
FIG. 13
FIG. 14
FIG. 15

1

METHOD AND DEVICE USED IN COMMUNICATION NODE FOR WIRELESS COMMUNICATION

CROSS REFERENCE TO RELATED APPLICATIONS

This application claims the priority benefit of Chinese Patent Application No. 202111661442.7, filed on Dec. 31, 2021, the full disclosure of which is incorporated herein by reference.

BACKGROUND

Technical Field

The present application relates to transmission methods and devices in wireless communication systems, and in particular to a transmission method and device for mobility.

Related Art

In the existing techniques, a User Equipment (UE) can perform Handover in a Radio Resource Control_Connected (RRC_Connetced) state, and, if the Handover (HO) is failed, initiates a Radio Resource Control (RRC) connection re-establishment procedure.

SUMMARY

The performance of RRC connection re-establishment procedure will result in a long period of data interruption, so when a UE fails its HO, it needs to seek enhancement on how to shorten the interruption delay.

To address the above problem, the present application provides a solution. In view of the above description about the issue, the scenario of New Radio (NR) is taken as an example; and the present application is also applicable to scenarios such as Long Term Evolution (LTE) or Sidelink (SL), where similar technical effect can be achieved. Additionally, the adoption of a unified solution for various scenarios contributes to the reduction of hardcore complexity and costs.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

It should be noted that if no conflict is incurred, embodiments in any node in the present application and the characteristics of the embodiments are also applicable to any other node, and vice versa. What's more, the embodiments in the present application and the characteristics in the embodiments can be arbitrarily combined if there is no conflict.

The present application provides a method in a first node for wireless communications, comprising:

receiving a first signaling, the first signaling being used for mobility control, and the first signaling being used for indicating at least a first target cell and a second target cell; and performing a first handshake process, the first handshake process being for the first target cell; and performing a second handshake process, the second handshake process being for the second target cell; and determining whether to initiate a Radio Resource Control (RRC) connection re-establishment procedure according to whether at least one of the first handshake process or the second handshake process is successfully completed;

herein, at least a former one of the first handshake process or the second handshake process is used for a Primary Cell (PCell) handover; a start time of the first handshake process is no later than a start time of the second handshake process; the action of determining whether to initiate an RRC connection re-establishment procedure according to whether at least one of the first handshake process or the second handshake process is successfully completed comprises: any one of the first handshake process or the second handshake process not being successfully completed is used to determine to initiate the RRC connection re-establishment procedure; at least one of the first handshake process or the second handshake process being successfully completed is used to determine not to initiate the RRC connection re-establishment procedure.

In one embodiment, a problem to be solved in the present application includes: the performance of RRC connection re-establishment procedure will result in a relatively long period of data interruption, so when a UE fails in HO, it needs to seek enhancement on how to shorten the interruption delay.

In one embodiment, a problem to be solved in the present application includes: how to enhance the success rate of handover.

In one embodiment, a problem to be solved in the present application includes: how to reduce the frequency of RRC connection re-establishment.

In one embodiment, characteristics of the above method include: only when any one of the first handshake process or the second handshake process is not successfully completed will the RRC connection re-establishment procedure be initiated.

In one embodiment, characteristics of the above method include: only when the first handshake process is not successfully completed and the second handshake process is not successfully completed will the RRC connection re-establishment procedure be initiated.

In one embodiment, characteristics of the above method include: within a time interval starting from the first handshake process being initiated till the second handshake process being initiated, the first node does not initiate an RRC connection re-establishment procedure.

In one embodiment, an advantage of the above method includes: enhancing the success rate of handover.

In one embodiment, an advantage of the above method includes: avoiding the RRC connection establishment.

In one embodiment, an advantage of the above method includes: shortening the interruption delay.

In one embodiment, a UE performs the first handshake process and the second handshake process simultaneously.

In one embodiment, after failing to perform the first handshake process the UE initiates the second handshake process.

In one embodiment, the first handshake process and the second handshake process are both used for PCell handover.

In one embodiment, the second handshake process is used for recovery for failure of the first handshake process.

In one embodiment, the first target cell and the second target cell are both target Primary Cell s (PCells).

In one embodiment, the first target cell is a target PCell, while the second target cell is a serving cell in a source Secondary Cell Group (SCG).

In one embodiment, the first target cell is a target PCell, while the second target cell is a target Primary SCG Cell (PSCell).

In one embodiment, the first target cell is a target PCell, while the second target cell is a source PSCell.

According to one aspect of the present application, characterized in that the first handshake process comprises:

transmitting a first radio signal on the first target cell; and monitoring a second radio signal on the first target cell;

herein, the first radio signal is used to trigger the second radio signal; whether the second radio signal is received is used to determine whether the first handshake process is successfully completed; the second radio signal being received is used to determine that the first handshake process is successfully completed, while the second radio signal not being received is used to determine that the first handshake process is not successfully completed; the first radio signal comprises at least a random access preamble.

According to one aspect of the present application, characterized in comprising:

along with initiation of the PCell handover, starting a first timer; the second radio signal being received during running of the first timer is used to determine that the first handshake process is successfully completed; the first timer being expired is used to determine that the first handshake process is not successfully completed.

According to one aspect of the present application, characterized in that the second handshake process comprises:

transmitting a first message on the second target cell; and as a response to the first message being transmitted, monitoring a second message;

herein, whether the second message is received is used to determine whether the second handshake process is successfully completed; the second message being received is used to determine that the second handshake process is successfully completed, while the second message not being received is used to determine that the second handshake process is not successfully completed.

According to one aspect of the present application, characterized in comprising:

along with the first message, starting a second timer; the second message being received during running of the second timer is used to determine that the second handshake process is successfully completed; the second timer being expired is used to determine that the second handshake process is not successfully completed.

According to one aspect of the present application, characterized in that the first message and the second message are both RRC layer signalings; the first message comprises at least a measurement report.

According to one aspect of the present application, characterized in that the first message is a physical layer signaling; the first message comprises at least a random access preamble.

According to one aspect of the present application, characterized in that the first handshake process not being successfully completed is used to trigger the first message.

According to one aspect of the present application, characterized in comprising:

as a response to the first handshake process being successfully completed, transmitting a second signaling, the second signaling being used to acknowledge that the PCell handover is successfully completed.

According to one aspect of the present application, characterized in that the second signaling is used to trigger a handover success message; the handover success message is used for notifying that the PCell handover is successfully completed.

According to one aspect of the present application, characterized in that the handover success message is used to trigger an SN (i.e., Secondary Node) release request message; the release request message is used to trigger an SN release request acknowledge message; a first field in the SN release request message is used to indicate the PCell handover.

According to one aspect of the present application, characterized in comprising:

as a response to the second handshake process being successfully completed, performing a target procedure.

According to one aspect of the present application, characterized in that a handover request message is used to trigger a handover request acknowledge message; the handover request acknowledge message is used to trigger the first signaling.

According to one aspect of the present application, characterized in that the handover request message is used to trigger an SN addition request message; the SN addition request message is used to trigger an SN addition request acknowledge message; the SN addition request acknowledge message is used to trigger the handover request acknowledge message.

The present application provides a method in a second node for wireless communications, comprising:

transmitting a first signaling, the first signaling being used for mobility control, and the first signaling being used for indicating at least a first target cell and a second target cell;

herein, a first handshake process is performed, the first handshake process being for the first target cell; and a second handshake process is performed, the second handshake process being for the second target cell; and whether at least one of the first handshake process or the second handshake process is successfully completed is used to determine an RRC connection re-establishment procedure is to be initiated; at least a former one of the first handshake process or the second handshake process is used for a PCell handover; a start time of the first handshake process is no later than a start time of the second handshake process; the action of determining whether to initiate an RRC connection re-establishment procedure according to whether at least one of the first handshake process or the second handshake process is successfully completed comprises: any one of the first handshake process or the second handshake process not being successfully completed is used to determine to initiate the RRC connection re-establishment procedure; at least one of the first handshake process or the second handshake process being successfully completed is used to determine not to initiate the RRC connection re-establishment procedure.

According to one aspect of the present application, characterized in comprising:

transmitting a handover request message; and receiving a handover request acknowledge message;

herein, the handover request message is used to trigger the handover request acknowledge message; the handover request acknowledge message is used to trigger the first signaling.

According to one aspect of the present application, characterized in that the handover request message is used to trigger an SN addition request message; the SN addition request message is used to trigger an SN addition request acknowledge message; the SN addition request acknowledge message is used to trigger the handover request acknowledge message.

According to one aspect of the present application, characterized in comprising:

transmitting an SN release request message, where a first field in the SN release request message is used to indicate the PCell handover;

and as a response to the SN release request message being transmitted, receiving an SN release request acknowledge message.

According to one aspect of the present application, characterized in comprising:

receiving a handover success message; the handover success message is used to trigger an SN release request message; the handover success message is used for notifying that the PCell handover is successfully completed.

According to one aspect of the present application, characterized in that as a response to the first handshake process being successfully completed, a second signaling is transmitted, the second signaling being used to acknowledge that the PCell handover is successfully completed; the second signaling is used to trigger the handover success message.

According to one aspect of the present application, characterized in that the first handshake process comprises: a first radio signal being transmitted on the first target cell; and a second radio signal being monitored on the first target cell; the first radio signal is used to trigger the second radio signal; whether the second radio signal is received is used to determine whether the first handshake process is successfully completed; the second radio signal being received is used to determine that the first handshake process is successfully completed, while the second radio signal not being received is used to determine that the first handshake process is not successfully completed; the first radio signal comprises at least a random access preamble.

According to one aspect of the present application, characterized in that along with the PCell handover being initiated, a first timer is started; the second radio signal being received during running of the first timer is used to determine that the first handshake process is successfully completed; the first timer being expired is used to determine that the first handshake process is not successfully completed.

According to one aspect of the present application, characterized in that the second handshake process comprises: a first message being transmitted on the second target cell; as a response to the first message being transmitted, a second message being monitored; whether the second message is received is used to determine whether the second handshake process is successfully completed; the second message being received is used to determine that the second handshake process is successfully completed, while the second message not being received is used to determine that the second handshake process is not successfully completed.

According to one aspect of the present application, characterized in that along with the first message, a second timer is started; the second message being received during running of the second timer is used to determine that the second handshake process is successfully completed; the second timer being expired is used to determine that the second handshake process is not successfully completed.

According to one aspect of the present application, characterized in that as a response to the second handshake process being successfully completed, a target procedure is performed.

According to one aspect of the present application, characterized in comprising:

the second receiver, receiving a third message; and the second transmitter, transmitting a fourth message;

herein, the first message triggers the third message; the third message triggers the fourth message;

and the fourth message triggers the second message; the third message comprises the first message; the fourth message comprises the second message.

The present application provides a method in a third node for wireless communications, comprising:

receiving a handover request message; and transmitting a handover request acknowledge message;

herein, a first signaling is transmitted, the first signaling being used for mobility control, and the first signaling being used for indicating at least a first target cell and a second target cell; a first handshake process is performed, the first handshake process being for the first target cell; and a second handshake process is performed, the second handshake process being for the second target cell; and whether at least one of the first handshake process or the second handshake process is successfully completed is used to determine an RRC connection re-establishment procedure is to be initiated; at least a former one of the first handshake process or the second handshake process is used for a PCell handover; a start time of the first handshake process is no later than a start time of the second handshake process; the action of determining whether to initiate an RRC connection re-establishment procedure according to whether at least one of the first handshake process or the second handshake process is successfully completed comprises: any one of the first handshake process or the second handshake process not being successfully completed is used to determine to initiate the RRC connection re-establishment procedure; at least one of the first handshake process or the second handshake process being successfully completed is used to determine not to initiate the RRC connection re-establishment procedure; the handover request message is used to trigger the handover request acknowledge message; the handover request acknowledge message is used to trigger the first signaling.

According to one aspect of the present application, characterized in comprising:

as a response to the handover request message being received, transmitting an SN addition request message;

and as a response to the SN addition request message being transmitted, receiving an SN addition request acknowledge message;

herein, the SN addition request acknowledge message is used to trigger the handover request acknowledge message.

According to one aspect of the present application, characterized in comprising:

monitoring a first radio signal; and determining whether to transmit the second radio signal according to whether the first radio signal is received; herein, the first radio signal is used to trigger the second radio signal; whether the second radio signal is received is used to determine whether the first handshake process is successfully completed; the second radio signal being received is used to determine that the first handshake process is successfully completed, while the second radio signal not being received is used to determine that the first handshake process is not successfully completed; the first radio signal comprises at least a random access preamble.

According to one aspect of the present application, characterized in comprising:

receiving a second signaling; the second signaling is used to acknowledge that the PCell handover is successfully completed.

According to one aspect of the present application, characterized in comprising:

as a response to the second signaling being received, transmitting a handover success message; the handover success message is used for notifying that the PCell handover is successfully completed.

According to one aspect of the present application, characterized in that the handover success message is used to trigger an SN release request message; the release request message is used to trigger an SN release request acknowledge message; a first field in the SN release request message is used to indicate the PCell handover.

According to one aspect of the present application, characterized in that the second handshake process comprises: a first message being transmitted on the second target cell; as a response to the first message being transmitted, a second message being monitored; whether the second message is received is used to determine whether the second handshake process is successfully completed; the second message being received is used to determine that the second handshake process is successfully completed, while the second message not being received is used to determine that the second handshake process is not successfully completed.

According to one aspect of the present application, characterized in comprising:

the third receiver, receiving a third message; and the third transmitter, transmitting a fourth message;

herein, the first message triggers the third message; the third message triggers the fourth message; and the fourth message triggers the second message; the third message comprises the first message; the fourth message comprises the second message.

The present application provides a method in a fourth node for wireless communications, comprising:

monitoring a first message; and determining whether to transmit a second message according to whether the first message is received;

herein, a first signaling is transmitted, the first signaling being used for mobility control, and the first signaling being used for indicating at least a first target cell and a second target cell; a first handshake process is performed, the first handshake process being for the first target cell; and a second handshake process is performed, the second handshake process being for the second target cell; and whether at least one of the first handshake process or the second handshake process is successfully completed is used to determine an RRC connection re-establishment procedure is to be initiated; at least a former one of the first handshake process or the second handshake process is used for a PCell handover; a start time of the first handshake process is no later than a start time of the second handshake process; the action of determining whether to initiate an RRC connection re-establishment procedure according to whether at least one of the first handshake process or the second handshake process is successfully completed comprises: any one of the first handshake process or the second handshake process not being successfully completed is used to determine to initiate the RRC connection re-establishment procedure; at least one of the first handshake process or the second handshake process being successfully completed is used to determine not to initiate the RRC connection re-establishment procedure; whether the second message is received is used to determine whether the second handshake process is successfully completed; the second message being received is used to determine that the second handshake process is successfully completed, while the second message not being received is used to determine that the second handshake process is not successfully completed.

According to one aspect of the present application, characterized in that a handover request message is used to trigger a handover request acknowledge message; the handover request acknowledge message is used to trigger the first signaling.

According to one aspect of the present application, characterized in comprising:

receiving an SN addition request message; and as a response to the SN addition request message being received, transmitting an SN addition request acknowledge message; the handover request message is used to trigger an SN addition request message; the SN addition request acknowledge message is used to trigger the handover request acknowledge message.

According to one aspect of the present application, characterized in comprising:

receiving an SN release request message, where a first field in the SN release request message is used to indicate the PCell handover;

and as a response to the SN release request message being received, transmitting an SN release request acknowledge message.

According to one aspect of the present application, characterized in that a handover success message is used to trigger the SN release request message; a second signaling is used to trigger the handover success message; the handover success message is used for notifying that the PCell handover is successfully completed; the second signaling is used to acknowledge that the PCell handover is successfully completed.

According to one aspect of the present application, characterized in comprising:

as a response to the first message being received, transmitting a third message; and as a response to the third message being transmitted, receiving a fourth message;

herein, the first message triggers the third message; the third message triggers the fourth message; and the fourth message triggers the second message; the third message comprises the first message; the fourth message comprises the second message.

The present application provides a first node for wireless communications, comprising:

a first receiver, receiving a first signaling, the first signaling being used for mobility control, and the first signaling being used for indicating at least a first target cell and a second target cell; and a first transceiver, performing a first handshake process, the first handshake process being for the first target cell; and performing a second handshake process, the second handshake process being for the second target cell; and determining whether to initiate a Radio Resource Control (RRC) connection re-establishment procedure according to whether at least one of the first handshake process or the second handshake process is successfully completed;

herein, at least a former one of the first handshake process or the second handshake process is used for a Primary Cell (PCell) handover; a start time of the first handshake process is no later than a start time of the second handshake process; the action of determining whether to initiate an RRC connection re-establishment procedure according to whether at least one of the first handshake process or the second handshake process is successfully completed comprises: any one of the first handshake process or the second handshake process not being successfully completed is used to determine to initiate the RRC connection re-establishment procedure; at least one of the first handshake process or the second handshake process being successfully completed is used to determine not to initiate the RRC connection re-establishment procedure.

The present application provides a second node for wireless communications, comprising:

a second transmitter, transmitting a first signaling, the first signaling being used for mobility control, and the first signaling being used for indicating at least a first target cell and a second target cell;

herein, a first handshake process is performed, the first handshake process being for the first target cell; and a second handshake process is performed, the second handshake process being for the second target cell; and whether at least one of the first handshake process or the second handshake process is successfully completed is used to determine an RRC connection re-establishment procedure is to be initiated; at least a former one of the first handshake process or the second handshake process is used for a PCell handover; a start time of the first handshake process is no later than a start time of the second handshake process; the action of determining whether to initiate an RRC connection re-establishment procedure according to whether at least one of the first handshake process or the second handshake process is successfully completed comprises: any one of the first handshake process or the second handshake process not being successfully completed is used to determine to initiate the RRC connection re-establishment procedure; at least one of the first handshake process or the second handshake process being successfully completed is used to determine not to initiate the RRC connection re-establishment procedure.

The present application provides a third node for wireless communications, comprising:

a third receiver, receiving a handover request message; and a third transmitter, transmitting a handover request acknowledge message;

herein, a first signaling is transmitted, the first signaling being used for mobility control, and the first signaling being used for indicating at least a first target cell and a second target cell; a first handshake process is performed, the first handshake process being for the first target cell; and a second handshake process is performed, the second handshake process being for the second target cell; and whether at least one of the first handshake process or the second handshake process is successfully completed is used to determine an RRC connection re-establishment procedure is to be initiated; at least a former one of the first handshake process or the second handshake process is used for a PCell handover; a start time of the first handshake process is no later than a start time of the second handshake process; the action of determining whether to initiate an RRC connection re-establishment procedure according to whether at least one of the first handshake process or the second handshake process is successfully completed comprises: any one of the first handshake process or the second handshake process not being successfully completed is used to determine to initiate the RRC connection re-establishment procedure; at least one of the first handshake process or the second handshake process being successfully completed is used to determine not to initiate the RRC connection re-establishment procedure; the handover request message is used to trigger the handover request acknowledge message; the handover request acknowledge message is used to trigger the first signaling.

The present application provides a fourth node for wireless communications, comprising:

a fourth receiver, monitoring a first message; and a fourth transmitter, determining whether to transmit a second message according to whether the first message is received;

herein, a first signaling is transmitted, the first signaling being used for mobility control, and the first signaling being used for indicating at least a first target cell and a second target cell; a first handshake process is performed, the first handshake process being for the first target cell; and a second handshake process is performed, the second handshake process being for the second target cell; and whether at least one of the first handshake process or the second handshake process is successfully completed is used to determine an RRC connection re-establishment procedure is to be initiated; at least a former one of the first handshake process or the second handshake process is used for a PCell handover; a start time of the first handshake process is no later than a start time of the second handshake process; the action of determining whether to initiate an RRC connection re-establishment procedure according to whether at least one of the first handshake process or the second handshake process is successfully completed comprises: any one of the first handshake process or the second handshake process not being successfully completed is used to determine to initiate the RRC connection re-establishment procedure; at least one of the first handshake process or the second handshake process being successfully completed is used to determine not to initiate the RRC connection re-establishment procedure; whether the second message is received is used to determine whether the second handshake process is successfully completed; the second message being received is used to determine that the second handshake process is successfully completed, while the second message not being received is used to determine that the second handshake process is not successfully completed.

In one embodiment, compared with the prior art, the present application is advantageous in the following aspects:
enhancing the success rate of handover;
avoiding the RRC connection establishment;
shortening the interruption delay.

BRIEF DESCRIPTION OF THE DRAWINGS

Other features, objects and advantages of the present application will become more apparent from the detailed description of non-restrictive embodiments taken in conjunction with the following drawings:

FIG. 1 illustrates a flowchart of transmission of a first signaling according to one embodiment of the present application.

FIG. 2 illustrates a schematic diagram of a network architecture according to one embodiment of the present application.

FIG. 3 illustrates a schematic diagram of a radio protocol architecture of a user plane and a control plane according to one embodiment of the present application.

FIG. 12 illustrates a flowchart of any of a first handshake process or a second handshake process not being successfully completed according to one embodiment of the present application.

FIG. 13 illustrates a structure block diagram of a processing device used in a first node according to one embodiment of the present application.

FIG. 14 illustrates a structure block diagram of a processing device used in a second node according to one embodiment of the present application.

FIG. 15 illustrates a structure block diagram of a processing device used in a third node according to one embodiment of the present application.

DESCRIPTION OF THE EMBODIMENTS

Figure 4:
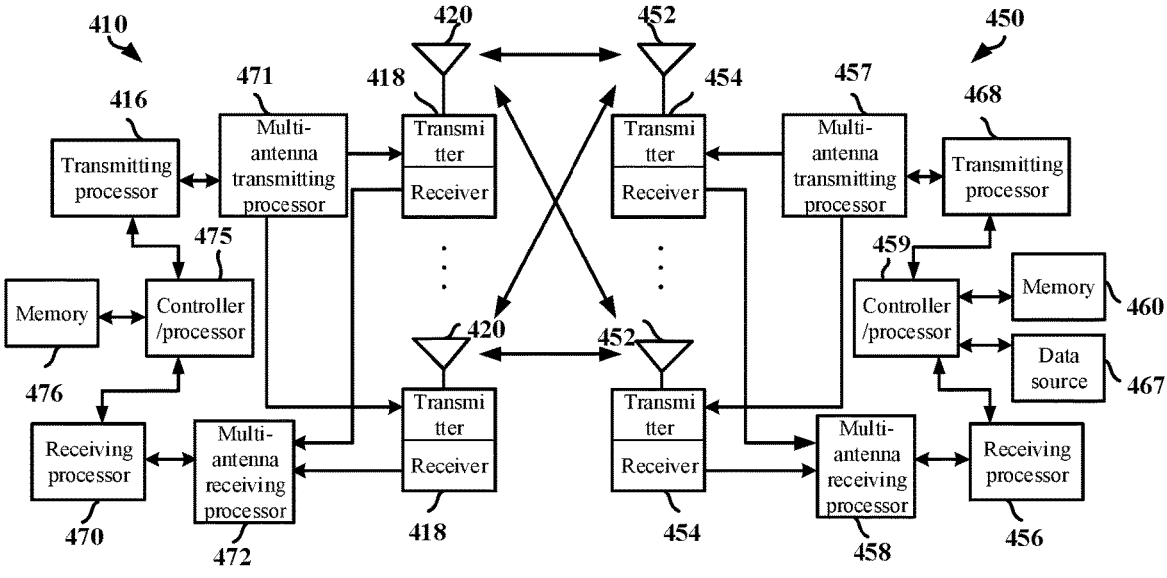
FIG. 4 illustrates a schematic diagram of a first communication device and a second communication device according to one embodiment of the present application.

The technical scheme of the present application is described below in further details in conjunction with the drawings. It should be noted that the embodiments of the present application and the characteristics of the embodiments may be arbitrarily combined if no conflict is caused.

Embodiment 1

Embodiment 1 illustrates a flowchart of transmission of a first signaling according to one embodiment of the present application, as shown in FIG. 1. In FIG. 1, each step represents a step, it should be particularly noted that the sequence order of each box herein does not imply a chronological order of steps marked respectively by these boxes.

In Embodiment 1, the first node in the present application receives a first signaling in step 101, the first signaling being used for mobility control, and the first signaling being used for indicating at least a first target cell and a second target cell; and performs a first handshake process in step 102, the first handshake process being for the first target cell; and performs a second handshake process, the second handshake process being for the second target cell; and determines in step 103 whether to initiate a Radio Resource Control (RRC) connection re-establishment procedure according to whether at least one of the first handshake process or the second handshake process is successfully completed; herein, at least a former one of the first handshake process or the second handshake process is used for a Primary Cell (PCell) handover; a start time of the first handshake process is no later than a start time of the second handshake process; the action of determining whether to initiate an RRC connection re-establishment procedure according to whether at least one of the first handshake process or the second handshake process is successfully completed comprises: any one of the first handshake process or the second handshake process not being successfully completed is used to determine to initiate the RRC connection re-establishment procedure; at least one of the first handshake process or the second handshake process being successfully completed is used to determine not to initiate the RRC connection re-establishment procedure.

In one embodiment, the mobility control includes handover.

In one embodiment, the mobility control includes the PCell handover.

In one embodiment, the PCell refers to a primary cell in a Master Cell Group (MCG).

In one embodiment, the PCell handover refers to switch from a source PCell of the first node to a target PCell.

In one embodiment, a transmitter for the first signaling is a maintenance base station for a serving cell of the first node.

In one embodiment, a transmitter for the first signaling is a maintenance base station for a source PCell.

In one embodiment, a transmitter for the first signaling is a maintenance base station for a source PSCell.

In one embodiment, a transmitter for the first signaling is the second node in the present application.

In one embodiment, a transmitter for the first signaling is a maintenance base station for the first cell, the first cell being a source PCell.

In one embodiment, a maintenance base station for the source PCell is a source Master Node (MN).

In one embodiment, a maintenance base station for the source PCell is a source Master NG-RAN (M-NG-RAN) node.

In one embodiment, a maintenance base station for the source PCell is a source NG-RAN node.

In one embodiment, the definition of M-NG-RAN can be found in TS 38.423.

In one embodiment, the definition of 5-NG-RAN can be found in TS 38.423.

In one embodiment, the definition of NG-RAN can be found in TS 38.423.

In one embodiment, the first signaling indicates the second target cell.

In one embodiment, the first signaling explicitly indicates the second target cell.

In one embodiment, the first signaling comprises an identifier of the second target cell.

In one embodiment, the first signaling comprises a Physical Cell Identifier (PCI) of the second target cell.

In one embodiment, the first signaling comprises configuration of the second target cell.

In one embodiment, the first signaling implicitly indicates the second target cell.

In one embodiment, the first field in the first signaling indicates that a source SCG is not released; the second target cell is a source PSCell in the source SCG.

In one embodiment, the first field in the first signaling indicates that a source SCG is not released; the second target cell is a serving cell in the source SCG.

In one embodiment, the first field in the first signaling indicates that resources associated between a maintenance base station for a source PCell of the first node and a maintenance base station for a source PSCell are not released; the second target cell is the source PSCell.

In one embodiment, the first field in the first signaling indicates that the second handshake process is allowed to be performed; the second handshake process is for the second target cell.

In one embodiment, the first field in the first signaling indicates that the second target cell can be used for performing a handover failure recovery; the second target cell is a source PSCell in the source SCG.

In one embodiment, the first field in the first signaling indicates that a source SCG can be used for performing a handover failure recovery; the second target cell is a source PSCell in the source SCG.

In one embodiment, the first field in the first signaling indicates that a source SCG can be used for performing a handover failure recovery; the second target cell is a serving cell in the source SCG.

In one embodiment, the first signaling comprises a first field, the first field being used to indicate the second target cell.

In one embodiment, the first signaling is used to indicate that the second target cell is not released.

In one embodiment, the first signaling comprising a first field is used to indicate that the second target cell is not released.

In one embodiment, a first field in the first signaling being set to true is used to indicate that the second target cell is not released.

In one embodiment, the first signaling comprises at least one RRC field of which the name includes reconfiguration-With Sync.

In one embodiment, the first signaling comprises at least one RRC field of which the name includes SpCellConfig.

In one embodiment, the first signaling comprises at least one RRC IE of which the name includes CellGroupConfig.

In one embodiment, the first signaling comprises at least one RRC field of which the name includes masterCellGroup.

In one embodiment, the first signaling comprises at least one RRC field of which the name includes secondaryCell-Group.

In one embodiment, the first signaling comprises at least one RRC field of which the name includes mrdc-Second-aryCellGroup.

In one embodiment, the first signaling comprises at least one RRC field of which the name includes nr-SCG.

In one embodiment, the first signaling comprises at least one RRC field of which the name includes mrdc-Second-aryCellGroupConfig.

In one embodiment, the first signaling comprises at least one RRC field of which the name includes masterCellGroup and one RRC field of which the name includes mrdc-SecondaryCellGroup.

In one embodiment, an RRC field of which the name includes reconfigurationWithSync comprised in the first signaling is used to indicate the first target cell.

In one subembodiment, the RRC field of which the name includes reconfigurationWithSync belongs to an RRC field whose name includes masterCellGroup.

In one embodiment, the first signaling indicates the first target cell.

In one subembodiment, the first signaling comprises a parameter reconfigured with sync to the first target cell.

In one subembodiment, the first signaling comprises an RRC field, the RRC field indicating a parameter reconfigured with sync to the first target cell, where the name of the RRC field includes reconfigurationWithSync.

In one subembodiment, the first signaling comprises an RRC field, where the name of the RRC field includes SpCellConfig.

In one embodiment, the first signaling indicates the second target cell.

In one subembodiment, the first signaling comprises a parameter reconfigured with sync to the second target cell.

In one subembodiment, the first signaling comprises an RRC field, the RRC field indicating a parameter reconfigured with sync to the second target cell, where the name of the RRC field includes reconfigurationWith Sync.

In one embodiment, the first signaling comprises a parameter reconfigured with sync to the second target cell and a parameter reconfigured with sync to the second target cell.

In one embodiment, the first signaling comprises a parameter reconfigured with sync to the second target cell but no parameter reconfigured with sync to the second target cell.

In one embodiment, the first target cell is a target PCell.

In one embodiment, the first target cell is a PCell in a target MCG.

In one embodiment, the first target cell is a Conditional Handover (CHO) candidate cell, for the definition of the CHO, refer to 3GPP TS 38.331 or 3GPP TS 36.331.

In one embodiment, the first target cell is a CHO candidate cell configured for the first cell.

In one embodiment, the first target cell is a Conditional Reconfiguration candidate cell configured for the first cell.

In one embodiment, the second target cell is a source PSCell.

In one embodiment, the second target cell is a PCell in a source SCG.

In one embodiment, the second target cell is any cell in a source SCG.

In one embodiment, the second target cell is a secondary cell (in a source SCG.

In one embodiment, the second target cell is a target PSCell.

In one embodiment, the second target cell is a target PCell.

In one embodiment, the second target cell is a PCell in a target SCG.

In one embodiment, the second target cell is any cell in a target SCG.

In one embodiment, the second target cell is a secondary cell in a target SCG.

In one embodiment, the second target cell is a CHO candidate cell.

In one embodiment, the second target cell is a CHO candidate cell configured for the first cell.

In one embodiment, the second target cell is a Conditional Reconfiguration candidate cell configured for the first cell.

In one embodiment, the first target cell is a target cell for handover, while the second target cell is a CHO candidate cell.

In one embodiment, the first target cell is a target cell for handover, while the second target cell is another target cell for handover.

In one embodiment, the first target cell is a CHO candidate cell, while the second target cell is another CHO candidate cell.

In one embodiment, the first target cell is a target PCell, while the second target cell is a target PCell.

In one embodiment, the first target cell is a target PCell, while the second target cell is a target PSCell.

In one embodiment, the first target cell is a target PCell, while the second target cell is a source PSCell.

In one embodiment, the first handshake process comprises at least transmitting a message to a maintenance base station for the first target cell, and receiving a message sent to the first node by the maintenance base station for the first target cell.

In one embodiment, the first handshake process comprises at least transmitting a message on the first target cell, and receiving an acknowledgment message for the message on the first target cell.

In one embodiment, the second handshake process comprises at least transmitting a message on the second target cell, and receiving an acknowledgment message for the message on the second target cell.

In one embodiment, the second handshake process comprises at least transmitting a message to a maintenance base station for the second target cell, and receiving a message sent to the first node by the maintenance base station for the second target cell.

In one embodiment, the action of performing a first handshake process includes the action of initiating the first handshake process.

In one embodiment, the action of performing a second handshake process includes the action of initiating the second handshake process.

In one embodiment, as a response to the first signaling being received, the first handshake process is initiated.

In one embodiment, as a response to a first execution condition being satisfied, the first handshake process is initiated; the first signaling indicates the first execution condition, the first execution condition being a triggering condition for applying a candidate configuration of the first target cell.

In one embodiment, as a response to the first signaling being received, the first handshake process is initiated and the second handshake process is initiated.

In one embodiment, as a response to a first execution condition and a second execution condition being satisfied, the first handshake process is initiated and the second handshake process is initiated; the first signaling indicates the first execution condition and the second execution condition, the first execution condition being a triggering condition for applying a candidate configuration of the first target cell, and the second execution condition being a triggering condition for applying a candidate configuration of the second target cell.

In one embodiment, the first handshake process being successfully completed means that the PCell handover is successful.

In one embodiment, the first handshake process being successfully completed means that a random access procedure for the first target cell is successfully completed.

In one embodiment, the first handshake process being successfully completed means that before expiration of the first timer, a random access procedure for the first target cell is successfully completed.

In one embodiment, the first handshake process being successfully completed means that before expiration of the first timer, a random access procedure for the first target cell is successfully completed.

In one embodiment, the action of determining whether to initiate an RRC connection re-establishment procedure according to whether at least one of the first handshake process or the second handshake process is successfully completed comprises: whether at least one of the first handshake process or the second handshake process is successfully completed being used to determine whether to initiate an RRC connection re-establishment procedure.

In one embodiment, the action of determining whether to initiate an RRC connection re-establishment procedure according to whether at least one of the first handshake process or the second handshake process is successfully completed comprises: determining whether to initiate an RRC connection re-establishment procedure according to whether the first handshake process is successfully completed and whether the second handshake process is successfully completed.

In one embodiment, the action of determining whether to initiate an RRC connection re-establishment procedure according to whether at least one of the first handshake process or the second handshake process is successfully completed comprises: whether the first handshake process is successfully completed and whether the second handshake process is successfully completed are used together to determine whether to initiate an RRC connection re-establishment procedure.

In one embodiment, the RRC connection re-establishment procedure is used to re-establish the RRC connection.

In one embodiment, the RRC connection re-establishment procedure is used to continue the RRC connection.

In one embodiment, the RRC connection re-establishment procedure is used to re-establish a Signaling Radio Bearer 1 (SRB1).

In one embodiment, the RRC connection re-establishment procedure is used to re-establish an SRB1.

In one embodiment, the first handshake process belongs to the PCell handover.

In one embodiment, the second handshake process belongs to the PCell handover.

In one embodiment, the second handshake process does not belong to the PCell handover.

In one embodiment, the first handshake process belongs to the PCell handover, and the second handshake process belongs to the PCell handover.

In one embodiment, the first handshake process belongs to the PCell handover, while the second handshake process does not belong to the PCell handover.

In one embodiment, the phrase that a start time of the first handshake process is no later than a start time of the second handshake process comprises: when the first handshake process starts to be performed, the second handshake process starts to be performed.

In one embodiment, the phrase that a start time of the first handshake process is no later than a start time of the second handshake process comprises: when the first handshake process starts to be performed, the second handshake process is not being performed.

In one embodiment, the phrase that a start time of the first handshake process is no later than a start time of the second handshake process comprises: a time at which the first handshake process is initialized is no later than a time at which the second handshake process is initialized.

In one embodiment, the phrase that a start time of the first handshake process is no later than a start time of the second handshake process comprises: a start time of the first handshake process is earlier than a start time of the second handshake process.

In one embodiment, the phrase that a start time of the first handshake process is no later than a start time of the second handshake process comprises: the first handshake process not being successfully completed is used to trigger the second handshake process.

In one embodiment, the phrase that a start time of the first handshake process is no later than a start time of the second handshake process comprises: if the first handshake process is not successfully completed, the second handshake process is initiated.

In one embodiment, the sentence that "any one of the first handshake process or the second handshake process not being successfully completed is used to determine to initiate the RRC connection re-establishment procedure; at least one of the first handshake process or the second handshake process being successfully completed is used to determine not to initiate the RRC connection re-establishment procedure" means that only when any one of the first handshake process or the second handshake process is not successfully completed will the RRC connection re-establishment procedure be initiated.

In one embodiment, the phrase that any one of the first handshake process or the second handshake process not being successfully completed is used to determine to initiate the RRC connection re-establishment procedure includes: the first handshake process being not successfully completed and the second handshake process being not successfully completed is used to determine to initiate the RRC connection re-establishment procedure.

In one embodiment, the phrase that any one of the first handshake process or the second handshake process not being successfully completed is used to determine to initiate the RRC connection re-establishment procedure includes: neither the first handshake process nor the second handshake process being successfully completed is used to determine to initiate the RRC connection re-establishment procedure.

In one embodiment, the phrase that at least one of the first handshake process or the second handshake process being successfully completed is used to determine not to initiate the RRC connection re-establishment procedure includes: any one of the first handshake process or the second handshake process being successfully completed is used to determine not to initiate the RRC connection re-establishment procedure.

In one embodiment, the phrase not to initiate the RRC connection re-establishment procedure means that the RRC connection re-establishment procedure is not triggered.

In one embodiment, the phrase not to initiate the RRC connection re-establishment procedure means that the RRC connection re-establishment procedure is not performed.

In one embodiment, the RRC field in the present application of which the name includes xxx refers to: xxx field.

In one embodiment, the RRC field in the present application of which the name includes xxx refers to: xxx-r8 field, or xxx-r9 field, or xxx-r10 field, or xxx-r11 field, or xxx-r12 field, or xxx-r13 field, or xxx-r4 field, or xxx-r15 field, or xxx-r16 field, or xxx-r17 field, or xxx-r18 field, or xxx-r19 field, or xxx-r20 field, or xxx-r21 field, or xxx-r22 field, or xxx-r23 field, or xxx-r24 field . . .

In one embodiment, the RRC IE in the present application of which the name includes xxx refers to: xxx IE.

In one embodiment, the RRC IE in the present application of which the name includes xxx refers to: xxx-r8 IE, or xxx-r9 IE, or xxx-r10 IE, or xxx-r11 IE, or xxx-r12 IE, or xxx-r13 IE, or xxx-r4 IE, or xxx-r15 IE, or xxx-r16 IE, or xxx-r17 IE, or xxx-r18 IE, or xxx-r19 IE, or xxx-r20 IE, or xxx-r21 IE, or xxx-r22 IE, or xxx-r23 IE, or xxx-r24 IE . . .

Embodiment 2

Embodiment 2 illustrates a schematic diagram of a network architecture according to one embodiment of the present application, as shown in FIG. 2. FIG. 2 is a diagram illustrating a network architecture 200 of 5G New Radio (NR)/Long-Term Evolution (LTE)/Long-Term Evolution Advanced (LTE-A) system. The 5G NR/LTE/LTE-A network architecture 200 may be called 5G System/Evolved Packet System (5GS/EPS) 200 or other appropriate terms. The 5GS/EPS 200 may comprise one or more UEs 201, a RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The RAN comprises a node 203 and other node 204 or other node 205. The node 203 provides UE 201 oriented user plane and control plane terminations. The node 203 can be connected to other node 204 via an Xn interface (like backhaul)/X2 interface. The node 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The node 203 provides an access point to the 5GC/EPC210 for the UE201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions.

Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The node 203 is connected to 5GC/EPC210 via a S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF211 is a control node for processing signaling between the UE201 and the 5GC/EPC210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, there exists an Xn interface (like backhaul)/X2 interface between the node 204 and the node 205, and the node 204 can be connected to other node 205 via the Xn interface (like backhaul)/X2 interface.

In one embodiment, there doesn't exist an Xn interface (like backhaul)/X2 interface between the node 204 and the node 205.

In one embodiment, there exists an Xn interface (like backhaul)/X2 interface between the node 203 and the node 205, and the node 203 can be connected to other node 205 via the Xn interface (like backhaul)/X2 interface.

In one embodiment, there doesn't exist an Xn interface (like backhaul)/X2 interface between the node 203 and the node 205.

In one embodiment, there exists at least one of an Xn interface (like backhaul)/X2 interface between the node 204 and the node 205, or an Xn interface (like backhaul)/X2 interface between the node 203 and the node 205.

In one embodiment, the UE 201 corresponds to the first node in the present application.

In one embodiment, the node 203 corresponds to the second node in the present application.

In one embodiment, the node 204 corresponds to the third node in the present application.

In one embodiment, the node 205 corresponds to the fourth node in the present application.

In one embodiment, the UE 201 corresponds to the first node in the present application.

In one embodiment, the UE 201 is a UE.

In one embodiment, the UE 241 corresponds to the second node in the present application.

In one embodiment, the UE 241 is a UE.

In one embodiment, the node 203 is a Base Station (BS).

In one embodiment, the node 203 is a UE.

In one embodiment, the node 203 is a relay.

In one embodiment, the node 203 is a Gateway.

In one embodiment, the node 204 is a base station.

In one embodiment, the node 204 is a UE.

In one embodiment, the node 204 is a relay.

In one embodiment, the node 204 is a Gateway.

In one embodiment, the node 205 is a base station.

In one embodiment, the node 205 is a UE.

In one embodiment, the node 205 is a relay.

In one embodiment, the node 205 is a Gateway.

In one embodiment, the UE supports transmissions in Non-Terrestrial Network (NTN).

In one embodiment, the UE supports transmissions in Terrestrial Network (TN).

In one embodiment, the UE supports transmissions in large-delay-difference networks.

In one embodiment, the UE supports Dual Connection (DC) transmissions.

In one embodiment, the UE includes a mobile terminal, or the UE includes an aircraft, or the UE includes a vehicle-mounted terminal, or the UE includes a vessel, or the UE includes an IoT terminal, or the UE includes an IIoT terminal, or the UE includes a device supporting low-delay and high-reliability transmission, or the UE includes testing equipment, or the UE includes a signaling test instrument.

In one embodiment, the base station is a BS, or the base station is a Base Transceiver Station (BTS), or the base station is a NodeB (NB), or the base station is a gNB, or the base station is an eNB, or the base station is an ng-eNB, or the base station is an en-gNB.

In one embodiment, the base station includes test equipment, or the base station includes a signaling test instrument, or the base station includes satellite equipment, or the base station includes a flight platform, or the base station includes a Macro Cellular base station, or the base station includes a Micro Cell base station, or the base station includes a Pico Cell base station, or the base station includes a Femtocell.

In one embodiment, the base station supports transmissions in NTN.

In one embodiment, the base station supports transmissions in large-delay-difference networks.

In one embodiment, the base station supports transmissions in TN.

In one embodiment, the base station comprises a base station device supporting large time-delay difference.

In one embodiment, the base station comprises a Transmitter Receiver Point (TRP).

In one embodiment, the base station comprises a Centralized Unit (CU).

In one embodiment, the base station comprises a Distributed Unit (DU).

In one embodiment, the base station comprises an Integrated Access and Backhaul-node (IAB-node).

In one embodiment, the base station comprises an IAB-donor.

In one embodiment, the base station comprises an IAB-donor-CU.

In one embodiment, the base station comprises an IAB-donor-DU.

In one embodiment, the base station comprises an IAB-DU.

In one embodiment, the base station comprises an IAB-MT.

In one embodiment, the relay comprises a L3 relay.

In one embodiment, the relay comprises a L2 relay.

In one embodiment, the relay comprises a Router.

In one embodiment, the relay comprises an Exchanger.

In one embodiment, the relay comprises a UE.

In one embodiment, the relay comprises a base station.

Embodiment 3

Embodiment 3 illustrates a schematic diagram of a radio protocol architecture of a user plane and a control plane according to the present application, as shown in FIG. 3.

FIG. 3 is a schematic diagram illustrating an embodiment of a radio protocol architecture of a user plane 350 and a control plane 300. In FIG. 3, the radio protocol architecture for a control plane 300 is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, which comprises a Medium Access Control (MAC) sublayer 302, a Radio Link Control (RLC) sublayer 303 and a Packet Data Convergence Protocol (PDCP) sublayer 304. The PDCP sublayer 304 provides multiplexing among variable radio bearers and logical channels. The PDCP sublayer 304 provides security by encrypting a packet and provides support for inter-cell handover. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating various radio resources (i.e., resource block) in a cell, as well as for HARQ operation. In the control plane 300, The RRC sublayer 306 in the L3 layer is responsible for acquiring radio resources (i.e., radio bearer) and configuring the lower layer using an RRC signaling. The radio protocol architecture in the user plane 350 comprises the L1 layer and the L2 layer. In the user plane 350, the radio protocol architecture used for a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics.

In one embodiment, the radio protocol architecture in FIG. 3 is applicable to the first node in the present application.

In one embodiment, the radio protocol architecture in FIG. 3 is applicable to the second node in the present application.

In one embodiment, the radio protocol architecture in FIG. 3 is applicable to the third node in the present application.

In one embodiment, the radio protocol architecture in FIG. 3 is applicable to the fourth node in the present application.

In one embodiment, the first signaling in the present application is generated by the RRC 306.

In one embodiment, the first signaling in the present application is generate by the MAC302 or the MAC352.

In one embodiment, the first signaling in the present application is generated by the PHY301 or the PHY351.

In one embodiment, the second signaling in the present application is generated by the RRC306.

In one embodiment, the second signaling in the present application is generate by the MAC302 or the MAC352.

In one embodiment, the second signaling in the present application is generated by the PHY301 or the PHY351.

In one embodiment, the first radio signal in the present application is generated by the RRC306.

In one embodiment, the first radio signal in the present application is generate by the MAC302 or the MAC352.

In one embodiment, the first radio signal in the present application is generated by the PHY301 or the PHY351.

In one embodiment, the second radio signal in the present application is generated by the RRC306.

In one embodiment, the second radio signal in the present application is generate by the MAC302 or the MAC352.

In one embodiment, the second radio signal in the present application is generated by the PHY301 or the PHY351.

In one embodiment, the first message in the present application is generated by the RRC306.

In one embodiment, the first message in the present application is generate by the MAC302 or the MAC352.

In one embodiment, the first message in the present application is generated by the PHY301 or the PHY351.

In one embodiment, the second message in the present application is generated by the RRC306.

In one embodiment, the second message in the present application is generate by the MAC302 or the MAC352.

In one embodiment, the second message in the present application is generated by the PHY301 or the PHY351.

Embodiment 4

Embodiment 4 illustrates a schematic diagram of a first communication device and a second communication device according to the present application, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of HARQ operation, a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication node 450 comprises at least one processor and at least one memory, the at least one memory comprises computer program codes; the at least one memory and the computer program codes are configured to be used in collaboration with the at least one processor. the first communication device 450 at least: receives a first signaling, the first signaling being used for mobility control, and the first signaling being used for indicating at least a first target cell and a second target cell; and performs a first handshake process, the first handshake process being for the first target cell; and performs a second handshake process, the second handshake process being for the second target cell; and determines whether to initiate a Radio Resource Control (RRC) connection re-establishment procedure according to whether at least one of the first handshake process or the second handshake process is successfully completed; herein, at least a former one of the first handshake process or the second handshake process is used for a Primary Cell (PCell) handover; a start time of the first handshake process is no later than a start time of the second handshake process; the action of determining whether to initiate an RRC connection re-establishment procedure according to whether at least one of the first handshake process or the second handshake process is successfully completed comprises: any one of the first handshake process or the second handshake process not being successfully completed is used to determine to initiate the RRC connection re-establishment procedure; at least one of the first handshake process or the second handshake process being successfully completed is used to determine not to initiate the RRC connection re-establishment procedure.

In one embodiment, the first communication node 450 comprises a memory that stores a computer readable instruction program, the computer readable instruction program generates actions when executed by at least one processor, which include: receiving a first signaling, the first signaling being used for mobility control, and the first signaling being used for indicating at least a first target cell and a second target cell; and performing a first handshake process, the first handshake process being for the first target cell; and performing a second handshake process, the second handshake process being for the second target cell; and determining whether to initiate a Radio Resource Control (RRC) connection re-establishment procedure according to whether at least one of the first handshake process or the second handshake process is successfully completed; herein, at least a former one of the first handshake process or the second handshake process is used for a Primary Cell (PCell) handover; a start time of the first handshake process is no later than a start time of the second handshake process; the action of determining whether to initiate an RRC connection re-establishment procedure according to whether at least one of the first handshake process or the second handshake process is successfully completed comprises: any one of the first handshake process or the second handshake process not being successfully completed is used to determine to initiate the RRC connection re-establishment procedure; at least one of the first handshake process or the second handshake process being successfully completed is used to determine not to initiate the RRC connection re-establishment procedure.

In one embodiment, the second communication node 410 comprises at least one processor and at least one memory, the at least one memory comprises computer program codes; the at least one memory and the computer program codes are configured to be used in collaboration with the at least one processor. The second communication device 410 at least: transmits a first signaling, the first signaling being used for mobility control, and the first signaling being used for indicating at least a first target cell and a second target cell; and herein, a first handshake process is performed, the first handshake process being for the first target cell; and a second handshake process is performed, the second handshake process being for the second target cell; and whether at least one of the first handshake process or the second handshake process is successfully completed is used to determine an RRC connection re-establishment procedure is to be initiated; at least a former one of the first handshake process or the second handshake process is used for a PCell handover; a start time of the first handshake process is no later than a start time of the second handshake process; the action of determining whether to initiate an RRC connection re-establishment procedure according to whether at least one of the first handshake process or the second handshake process is successfully completed comprises: any one of the first handshake process or the second handshake process not being successfully completed is used to determine to initiate the RRC connection re-establishment procedure; at least one of the first handshake process or the second handshake process being successfully completed is used to determine not to initiate the RRC connection re-establishment procedure.

In one embodiment, the second communication node 410 comprises a memory that stores a computer readable instruction program, the computer readable instruction program generates actions when executed by at least one processor, which include: transmitting a first signaling, the first signaling being used for mobility control, and the first signaling being used for indicating at least a first target cell and a second target cell; and herein, a first handshake process is performed, the first handshake process being for the first target cell; and a second handshake process is performed, the second handshake process being for the second target cell; and whether at least one of the first handshake process or the second handshake process is successfully completed is used to determine an RRC connection re-establishment procedure is to be initiated; at least a former one of the first handshake process or the second handshake process is used for a PCell handover; a start time of the first handshake process is no later than a start time of the second handshake process; the action of determining whether to initiate an RRC connection re-establishment procedure according to whether at least one of the first handshake process or the second handshake process is successfully completed comprises: any one of the first handshake process or the second handshake process not being successfully completed is used to determine to initiate the RRC connection re-establishment procedure; at least one of the first handshake process or the second handshake process being successfully completed is used to determine not to initiate the RRC connection re-establishment procedure.

In one embodiment, the antenna 452, the receiver 454, the receiving processor 456, and the controller/processor 459 are used for receiving a first signaling; at least one of the antenna 420, the transmitter 418, the transmitting processor 416 or the controller/processor 475 is used for transmitting a first signaling.

In one embodiment, the antenna 452, the transmitter 454, the transmitting processor 468 and the controller/processor 459 are used for transmitting a second signaling; at least one of the antenna 420, the receiver 418, the receiving processor 470 or the controller/processor 475 is used for receiving a second signaling.

In one embodiment, the antenna 452, the transmitter 454, the transmitting processor 468 and the controller/processor 459 are used for transmitting a first radio signal; at least one of the antenna 420, the receiver 418, the receiving processor 470 or the controller/processor 475 is used for receiving a first radio signal.

In one embodiment, the antenna 452, the receiver 454, the receiving processor 456, and the controller/processor 459 are used for monitoring or/and receiving a second radio signal; at least one of the antenna 420, the transmitter 418, the transmitting processor 416 or the controller/processor 475 is used for monitoring or/and transmitting a second radio signal.

In one embodiment, the antenna 452, the transmitter 454, the transmitting processor 468 and the controller/processor 459 are used for transmitting a first message; at least one of the antenna 420, the receiver 418, the receiving processor 470 or the controller/processor 475 is used for receiving a first message.

In one embodiment, the antenna 452, the receiver 454, the receiving processor 456, and the controller/processor 459 are used for monitoring or/and receiving a second message;

at least one of the antenna 420, the transmitter 418, the transmitting processor 416 or the controller/processor 475 is used for monitoring or/and transmitting a second message.

In one embodiment, the first communication device 450 corresponds to the first node in the present application.

In one embodiment, the second communication device 410 corresponds to the second node in the present application.

In one embodiment, the first communication device 450 is a UE.

In one embodiment, the first communication device 450 is a UE supporting large delay difference.

In one embodiment, the first communication device 450 is a UE supporting NTN.

In one embodiment, the first communication device 450 is an aircraft.

In one embodiment, the first communication device 450 is capable of positioning.

In one embodiment, the first communication device 450 is incapable of positioning.

In one embodiment, the first communication device 450 is a UE supporting TN.

In one embodiment, the second communication device 410 is a base station (gNB/eNB/ng-eNB).

In one embodiment, the second communication device 410 is a base station supporting large delay difference.

In one embodiment, the second communication device 410 is a base station supporting NTN.

In one embodiment, the second communication device 410 is satellite equipment.

In one embodiment, the second communication device 410 is a flight platform.

In one embodiment, the second communication device 410 is a base station supporting TN.

Embodiment 5

Figure 5:
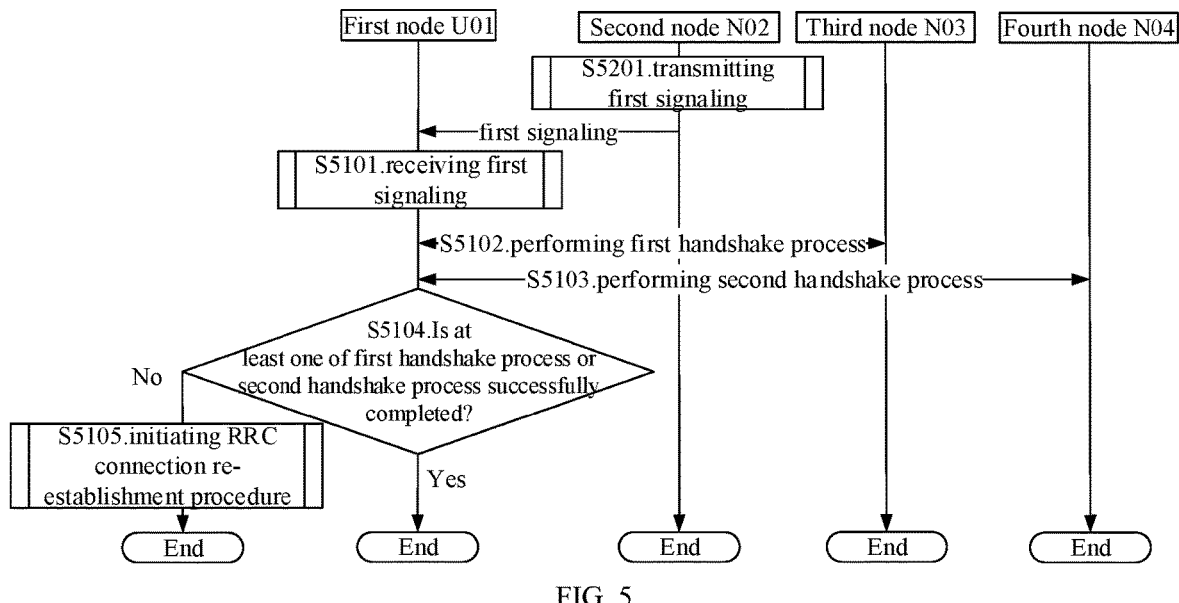
FIG. 5 illustrates a flowchart of radio signal transmission according to one embodiment of the present application.

Embodiment 5 illustrates a flowchart of radio signal transmission according to one embodiment of the present application, as shown in FIG. 5. It should be particularly noted that the sequence illustrated herein does not set any limit to the signal transmission order or implementation order in the present application.

The first node U01 receives a first signaling in step S5101, the first signaling being used for mobility control, and the first signaling being used for indicating at least a first target cell and a second target cell; and performs a first handshake process in step S5102, the first handshake process being for the first target cell; and performs a second handshake process in step S5103, the second handshake process being for the second target cell; in step S5104, determines whether at least one of the first handshake process or the second handshake process is successfully completed; and determines whether to initiate a Radio Resource Control (RRC) connection re-establishment procedure according to whether at least one of the first handshake process or the second handshake process is successfully completed; if any of the first handshake process or the second handshake process is not successfully completed, enter step S5105; otherwise, skip the step S5105; initiates the RRC connection re-establishment procedure in step S5105.

The second node N02 transmits the first signaling in step S5201.

The third node N03 performs the first handshake process in step S5102.

The fourth node N04 performs the second handshake process in step S5103.

In Embodiment 5, at least a former one of the first handshake process or the second handshake process is used for a Primary Cell (PCell) handover; a start time of the first handshake process is no later than a start time of the second handshake process; the action of determining whether to initiate an RRC connection re-establishment procedure according to whether at least one of the first handshake process or the second handshake process is successfully completed comprises: any one of the first handshake process or the second handshake process not being successfully completed is used to determine to initiate the RRC connection re-establishment procedure; at least one of the first handshake process or the second handshake process being successfully completed is used to determine not to initiate the RRC connection re-establishment procedure.

In one embodiment, the first node U01 is a UE.

In one embodiment, the first node U01 is a base station.

In one embodiment, the first node U01 is a relay device.

In one embodiment, the second node N02 is a UE.

In one embodiment, the second node N02 is a relay device.

In one embodiment, the second node N02 is a base station.

In one embodiment, the second node N02 is a maintenance base station for the first cell.

In one embodiment, the second node N02 is a maintenance base station for a serving cell of the first node U01.

In one embodiment, the second node N02 is a source MN of the first node U01.

In one embodiment, the second node N02 is a source Secondary Node (SN) of the first node U01.

In one embodiment, the second node N02 is a MN.

In one embodiment, the second node N02 is a M-NG-RAN node.

In one embodiment, the second node N02 is a NG-RAN node.

In one embodiment, the third node N03 is a UE.

In one embodiment, the third node N03 is a relay device.

In one embodiment, the third node N03 is a base station.

In one embodiment, the third node N03 is a MN.

In one embodiment, the third node N03 is a M-NG-RAN node.

In one embodiment, the third node N03 is a NG-RAN node.

In one embodiment, the third node N03 is a maintenance base station for the first target cell.

In one embodiment, the third node N03 is a target MN of the first node U01.

In one embodiment, the fourth node N04 is a SN.

In one embodiment, the fourth node N04 is a S-NG-RAN node.

In one embodiment, the fourth node N04 is a UE.

In one embodiment, the fourth node N04 is a relay device.

In one embodiment, the fourth node N04 is a base station.

In one embodiment, the fourth node N04 is a maintenance base station for the second target cell.

In one embodiment, the fourth node N04 is a target SN.

In one embodiment, the fourth node N04 is a source SN.

In one embodiment, the fourth node N04 is a source S-NG-RAN node.

In one embodiment, the fourth node N04 is a target S-NG-RAN node.

In one embodiment, the step S5102 comprises transmitting the first radio signal in the present application.

In one embodiment, the step S5102 comprises receiving the second radio signal in the present application.

In one embodiment, the step S5103 comprises transmitting the first message in the present application.

In one embodiment, the step S5103 comprises receiving the second message in the present application.

In one embodiment, a start time of the step S5102 is no later than a start time of the step S5103.

In one embodiment, the step S5102 and the step S5103 share overlapping time.

In one embodiment, the step S5102 and the step S5103 do not share overlapping time.

Embodiment 6

Figure 6:
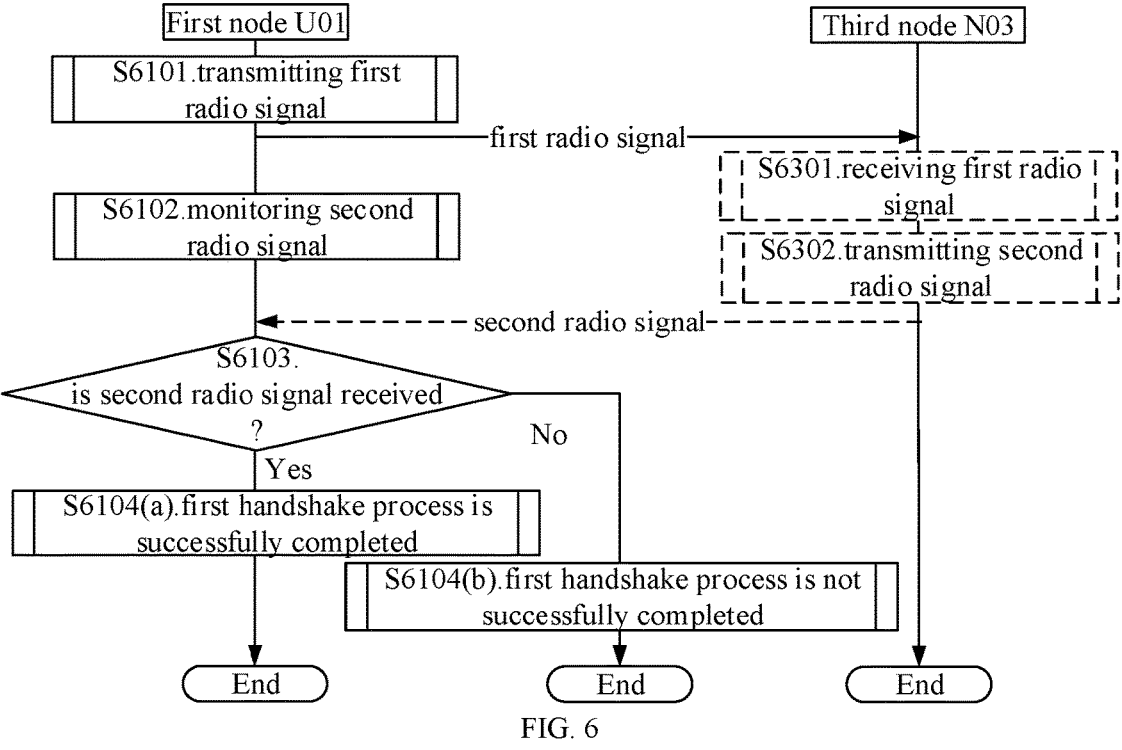
FIG. 6 illustrates a flowchart of radio signal transmission of a first handshake process according to one embodiment of the present application.

Embodiment 6 illustrates a flowchart of radio signal transmission of a first handshake process according to one embodiment of the present application, as shown in FIG. 6. It should be particularly noted that the sequence illustrated herein does not set any limit to the signal transmission order or implementation order in the present application.

The first node U01 transmits a first radio signal on the first target cell in step S6101; monitors a second radio signal on the first target cell in step S6102; and determines in step S6103 whether the second radio signal is received, if the second radio signal is received, enter step S6104(*a*), if the second radio signal is not received, enter step S6104(*b*); in step S6104(*a*), determines that the first handshake process is successfully completed; in step S6104(*b*), determines that the first handshake process is not successfully completed.

The third node N03 receives the first radio signal in step S6301; and transmits the second radio signal in step S6302.

In Embodiment 6, the first radio signal is used to trigger the second radio signal; whether the second radio signal is received is used to determine whether the first handshake process is successfully completed; the second radio signal being received is used to determine that the first handshake process is successfully completed, while the second radio signal not being received is used to determine that the first handshake process is not successfully completed; the first radio signal comprises at least a random access preamble.

In one embodiment, a receiver for the first radio signal is the third node N03.

In one embodiment, a transmitter for the second radio signal and a receiver for the first radio signal are the same.

In one embodiment, the third node N03 is a maintenance base station for the first target cell, the first target cell being a target PCell.

In one embodiment, a receiver for the first radio signal is a maintenance base station for the first target cell, the first target cell being a target PCell.

In one embodiment, a maintenance base station for the target PCell is a target MN.

In one embodiment, a maintenance base station for the target PCell is a target M-NG-RAN node.

In one embodiment, a maintenance base station for the target PCell is a target NG-RAN node.

In one embodiment, transmitting a first radio signal on the first target cell comprises that: the first radio signal is received by a maintenance base station for the first target cell.

In one embodiment, transmitting a first radio signal on the first target cell comprises that: resources of the first radio signal are configured by the first target cell.

In one embodiment, the first radio signal is a physical layer signal.

In one embodiment, the first radio signal comprises a physical layer signal and a higher layer signal.

In one embodiment, the first radio signal is a Message 1 (Msg1).

In one embodiment, the first radio signal is a Message A (MsgA).

In one embodiment, the first radio signal comprises a random access preamble and a Physical Uplink Shared CHannel (PUSCH) transmission.

In one embodiment, the first radio signal is a last random access preamble transmitted in the first random access procedure.

In one embodiment, the first radio signal comprises a last random access preamble transmitted in the first random access procedure.

In one embodiment, monitoring a second radio signal on the first target cell comprises that: the second radio signal is transmitted by a maintenance base station for the first target cell.

In one embodiment, monitoring a second radio signal on the first target cell comprises that: monitoring a second radio signal through a Radio Network Temporary Identifier (RNTI) allocated by the first target cell.

In one subembodiment, the RNTI allocated by the first target cell is a Cell RNTI (C-RNTI).

In one subembodiment, the RNTI allocated by the first target cell is a RA-RNTI.

In one subembodiment, the RNTI allocated by the first target cell is a MSGB-RNTI.

In one embodiment, monitoring a second radio signal comprises: a Physical Downlink Control Channel (PDCCH) identified by a RA-RNTI being monitored determines whether a valid downlink assignment is received.

In one embodiment, monitoring a second radio signal comprises: determining whether the second radio signal exists or not.

In one embodiment, monitoring a second radio signal comprises: determining whether the second radio signal exists according to a Cyclic Redundancy Check (CRC).

In one embodiment, a PDCCH identified by a RA-RNTI being monitored is used to monitor the second radio signal.

In one embodiment, a second radio signal is monitored during a time while a ra-ResponseWindow is running.

In one embodiment, a second radio signal is monitored during a time while a msgB-ResponseWindow is running.

In one embodiment, a second radio signal is monitored during a time while a ra-ContentionResolutionTimer is running.

In one embodiment, the second radio signal is used to determine that a random access procedure that the first radio signal belongs to is successfully completed.

In one embodiment, if the second radio signal is received, it is assumed that a random access procedure that the first radio signal belongs to is successfully completed.

In one embodiment, the second radio signal comprises a PDCCH.

In one embodiment, the second radio signal comprises a valid downlink assignment received on a PDCCH.

In one embodiment, the second radio signal comprises a valid downlink assignment received on a PDCCH identified by a RA-RNTI.

In one embodiment, the second radio signal comprises a valid downlink assignment received on a PDCCH identified by a MSGB-RNTI.

In one embodiment, the downlink assignment that is valid comprises a MAC Random Access Response (RAR).

In one embodiment, the downlink assignment that is valid comprises a fallbackRAR.

In one embodiment, the phrase that the first radio signal is used to trigger the second radio signal includes the following meaning: as a response to the first radio signal being transmitted, receiving the second radio signal.

In one subembodiment of the above embodiment, a RA_TYPE to which the first radio signal belongs is 4-stepRA, the first radio signal being used for CFRA, and the second radio signal comprising a MAC RAR.

In one subembodiment of the above embodiment, a RA_TYPE to which the first radio signal belongs is 2-stepRA, the first radio signal being used for CFRA, and the second radio signal comprising a fallbackRAR.

In one subembodiment of the above embodiment, a RA_TYPE to which the first radio signal belongs is 2-stepRA, the first radio signal being used for CBRA, and the second radio signal comprising a succe ssRAR.

In one embodiment, the phrase that the first radio signal is used to trigger the second radio signal includes the following meaning: as a response to the first radio signal being transmitted, receiving a Message 2 (Msg2); as a response to the Msg2 being received, transmitting a Message 3 (Msg3); and as a response to the Msg3 being transmitted, receiving the second radio signal.

In one subembodiment of the above embodiment, a RA_TYPE to which the first radio signal belongs is 4-stepRA, the first radio signal being used for CBRA.

In one subembodiment, the Msg2 is a MAC RAR.

In one subembodiment, the Msg2 indicates an UpLink grant (UL grant).

In one subembodiment, the Msg3 comprises a C-RNTI MAC CE, the C-RNTI MAC CE comprising a first RNTI.

In one subembodiment, the second radio signal is a PDCCH transmission addressed to the first RNTI.

In one subembodiment, the second radio signal comprises a UL grant for a new transmission.

In one embodiment, the phrase that the first radio signal is used to trigger the second radio signal includes the following meaning: as a response to the first radio signal being transmitted, receiving a Message B (MsgB); as a response to the MsgB being received, transmitting a Msg3; and as a response to the Msg3 being transmitted, receiving the second radio signal.

In one subembodiment of the above embodiment, a RA_TYPE to which the first radio signal belongs is 4-stepRA, the first radio signal being used for CBRA.

In one subembodiment, the MsgB is a fallbackRAR.

In one subembodiment, the MsgB indicates an UpLink grant (UL grant).

In one subembodiment, the Msg3 comprises a C-RNTI MAC CE, the C-RNTI MAC CE comprising a first RNTI.

In one subembodiment, the second radio signal is a PDCCH transmission addressed to the first RNTI.

In one subembodiment, the second radio signal comprises a UL grant for a new transmission.

In one embodiment, the first RNTI is a C-RNTI.

In one embodiment, the first RNTI is a C-RNTI of the first node U01 in the first target cell.

In one embodiment, the first RNTI is a RNTI assigned by a maintenance base station for the first target cell.

In one embodiment, when the second radio signal is received, a PREAMBLE_TRANSMISSION_COUNTER hasn't reached preambleTransMax+1.

In one embodiment, within a time interval from the first radio signal being transmitted to the second radio signal being received, a PREAMBLE_TRANSMISSION_ COUNTER is not set to 1.

In one embodiment, the second radio signal is received.

In one embodiment, the second radio signal is not received.

In one embodiment, the phrase that the first radio signal is used to trigger the second radio signal includes the following meaning: after the first radio signal is transmitted, receiving the second radio signal.

In one embodiment, the phrase that the first radio signal is used to trigger the second radio signal includes the following meaning: the first radio signal directly triggering the second radio signal.

In one embodiment, the phrase that the first radio signal is used to trigger the second radio signal includes the following meaning: the first radio signal indirectly triggering the second radio signal.

In one embodiment, the phrase that the first radio signal is used to trigger the second radio signal includes the following meaning: the first radio signal and the second radio signal belonging to a same random access procedure.

In one embodiment, the phrase that the first radio signal is used to trigger the second radio signal includes the following meaning: the first radio signal being used for initiating a random access procedure, while the second radio signal being used to determine that the random access procedure is successfully completed.

In one embodiment, the phrase that whether the second radio signal is received is used to determine whether the first handshake process is successfully completed comprises that: whether the second radio signal is received is used to determine whether a random access procedure to which the first radio signal belongs is successfully completed, whether the random access procedure to which the first radio signal belongs is successfully completed is used to determine whether the first handshake process is successfully completed.

In one embodiment, the phrase that whether the second radio signal is received is used to determine whether the first handshake process is successfully completed comprises that: whether the first handshake process is successfully completed is related to whether the second radio signal is received.

In one embodiment, the second radio signal being received is used to determine that the random access procedure that the first radio signal belongs to is successfully completed; the random access procedure that the first radio signal belongs to being successfully completed is used to determine that the first handshake process is successfully completed.

In one embodiment, the second radio signal not being received is used to determine that the random access procedure that the second radio signal belongs to is not successfully completed; the random access procedure that the second radio signal belongs to not being successfully completed is used to determine that the first handshake process is not successfully completed.

In one embodiment, that a PREAMBLE_TRANSMISSION_COUNTER does not reach preambleTransMax+1 is used to determine that the first radio signal is not received.

In one embodiment, a ra-ResponseWindow being expired is used to determine that the first radio signal is not received.

In one embodiment, a msgB-ResponseWindow being expired is used to determine that the first radio signal is not received.

In one embodiment, a ra-ContentionResolutionTimer being expired is used to determine that the first radio signal is not received.

In one embodiment, the random access preamble comprises a signature sequence.

In one embodiment, the random access preamble comprises a bit string.

In one embodiment, the random access preamble is a preamble for contention-free Random Access (CFRA).

In one embodiment, the random access preamble is a preamble for contention-based Random Access (CBRA).

In one embodiment, the first timer is T304.

In one embodiment, the first timer is for the first target cell.

In one embodiment, the first timer is for a cell group to which the first target cell belongs.

In one embodiment, the first timer is configured, and the first timer is started.

In one embodiment, the first timer is not configured, and the first timer is not started.

In one embodiment, the phrase that along with initiation of the PCell handover includes: when starting to perform reconfiguration with sync.

In one embodiment, the phrase that along with initiation of the PCell handover includes: when receiving the first signaling.

In one embodiment, the phrase that along with initiation of the PCell handover includes: after receiving the first signaling.

In one embodiment, the phrase that along with initiation of the PCell handover includes: when the first execution condition is satisfied.

In one embodiment, the phrase that along with initiation of the PCell handover includes: after at least one of a timer T310, or a timer T312 or a timer T316 is stopped.

In one embodiment, the phrase that along with initiation of the PCell handover includes: when configuration in reconfigurationWithSync for the first signaling is performed.

In one embodiment, the action of starting a first timer means: starting a timer.

In one embodiment, the action of starting a first timer means: the first timer beginning its time-counting.

In one embodiment, the action of starting a first timer means: the first timer starting running.

In one embodiment, the second radio signal being received is used to determine that the random access procedure that the first radio signal belongs to is successfully completed; the random access procedure that the first radio signal belongs to being successfully completed is used to determine that the first handshake process is successfully completed.

In one embodiment, the second radio signal being received during running of the first timer is used to determine to stop the first timer.

In one embodiment, the random access procedure to which the first radio signal belongs being successfully completed is used to determine to stop the first timer.

In one embodiment, the first handshake process not being successfully completed includes that the PCell handover is failed.

In one embodiment, the first handshake process not being successfully completed includes that a transition from the first cell to the first target cell is failed.

In one embodiment, the first timer being expired means that the second radio signal is not received as the first timer is running.

In one embodiment, the first timer being expired means that the random access procedure to which the first radio signal belongs is not successfully completed as the first timer is running.

In one embodiment, the first timer being expired means that running time of the first timer reaches an expiration value of the first timer.

In one embodiment, the first timer being expired means that a value of the first timer reaches an expiration value of the first timer.

In one embodiment, an expiration value of the first timer is configurable.

In one embodiment, an expiration value of the first timer is pre-configured.

In one embodiment, an expiration value of the first timer is configured through an RRC message.

In one embodiment, the first handshake process not being successfully completed includes that the first timer is expired.

In one embodiment, the first handshake process not being successfully completed includes that a random access procedure to which the first radio signal belongs is failed.

In one embodiment, the first handshake process not being successfully completed includes that the first timer is running, and the random access procedure to which the first radio signal belongs is not successfully completed.

In one embodiment, the first handshake process not being successfully completed includes that as the first timer is running, a measurement result on the first target cell is lower than a first threshold.

In one embodiment, the first handshake process not being successfully completed includes that as the first timer is running, a measurement result on the first target cell is lower than a first threshold, and a measurement result on a neighbor cell is no lower than a second threshold.

In one embodiment, the first handshake process not being successfully completed includes that as the first timer is running, a measurement result on the first target cell is lower than a measurement result on a neighbor cell.

In one embodiment, the above measurement result does not take into account an offset.

In one embodiment, the above measurement result integrates an offset.

In one embodiment, a measurement unit of the above first threshold is at least one of an RSRP, an RSRQ or an SINR.

In one embodiment, a measurement unit of the above second threshold is at least one of an RSRP, an RSRQ or an SINR.

In one embodiment, the above neighbor cell refers to a neighboring cell of the first target cell.

In one embodiment, the above neighbor cell refers to a neighboring cell of the first cell.

In one embodiment, the above neighbor cell includes a third target cell.

In one embodiment, a random access procedure to which the first radio signal belongs being failed includes that a PREAMBLE_TRANSMISSION_COUNTER of a random access procedure to which the first radio signal belongs reaches preambleTransMax+1.

In one embodiment, a random access procedure to which the first radio signal belongs being failed includes that a random access procedure to which the first radio signal belongs is not successfully completed.

In one embodiment, a random access procedure to which the first radio signal belongs being failed includes that a MAC entity of a cell group to which the first target cell belongs indicates the occurrence of a random access issue to an RRC layer.

In one embodiment, a random access procedure to which the first radio signal belongs being failed includes that a PREAMBLE_TRANSMISSION_COUNTER of a random access procedure to which the first radio signal belongs reaches preambleTransMax+1, and a MAC entity of a cell group to which the first target cell belongs indicates the occurrence of a random access issue to an RRC layer.

In one embodiment, the third node N03 receives the first radio signal.

In one embodiment, the third node N03 does not receive the first radio signal.

In one embodiment, the second radio signal is transmitted by the third node N03.

In one embodiment, the second radio signal is not transmitted by the third node N03.

Embodiment 7

Figure 7:
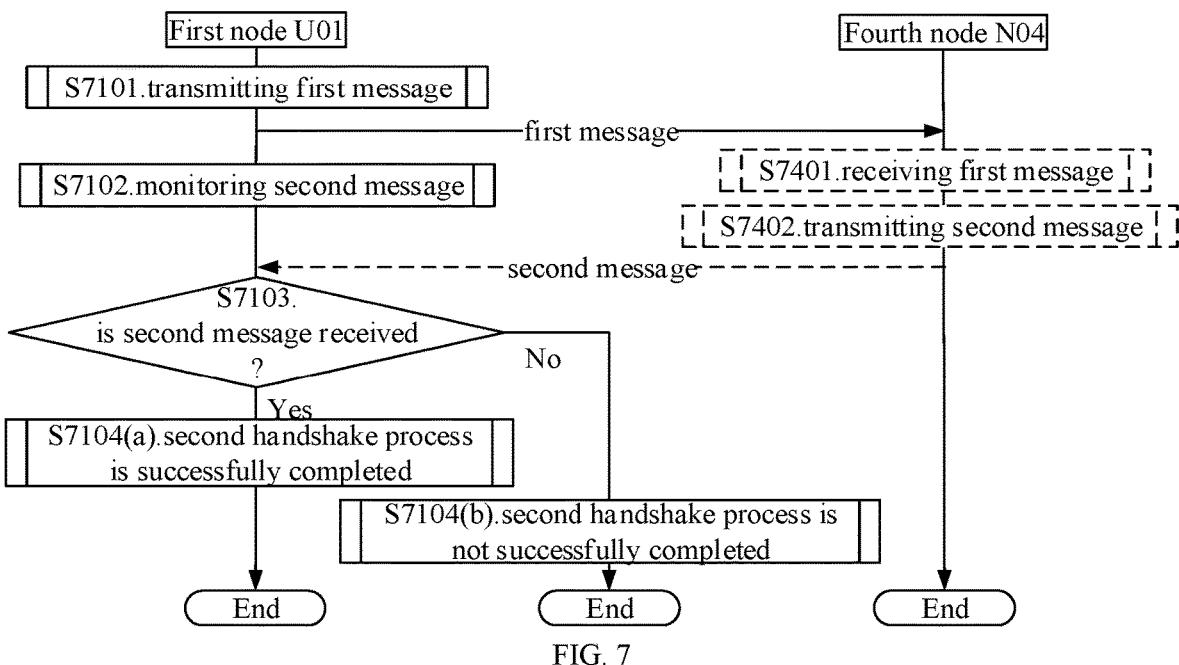
FIG. 7 illustrates a flowchart of radio signal transmission of a second handshake process according to one embodiment of the present application.

Embodiment 7 illustrates a flowchart of radio signal transmission of a second handshake process according to one embodiment of the present application, as shown in FIG. 7. It should be particularly noted that the sequence illustrated herein does not set any limit to the signal transmission order or implementation order in the present application.

The first node U01 transmits a first message on the second target cell in step S7101; as a response to the first message being transmitted, monitors a second message in step S7102; and determines whether the second message is received in step S7103; if the second message is received, enters step S7104(a), if the second message is not received, enters step S7104(b); in step S7104(a), determines that the second handshake process is successfully completed; in step S7104(b), determines that the second handshake process is not successfully completed.

The fourth node N04 receives the first message in step S7401; and transmits the second message in step S7402.

In Embodiment 7, whether the second message is received is used to determine whether the second handshake process is successfully completed; the second message being received is used to determine that the second handshake process is successfully completed, while the second message not being received is used to determine that the second handshake process is not successfully completed.

In one embodiment, a receiver for the first message is a maintenance base station for the second target cell, the second target cell being another target PCell.

In one embodiment, a maintenance base station for the other target PCell is another target MN.

In one embodiment, a maintenance base station for the other target PCell is another target M-NG-RAN node.

In one embodiment, a maintenance base station for the other target PCell is another target NG-RAN node.

In one embodiment, a receiver for the first message is a maintenance base station for the second target cell, the second target cell being a target PSCell.

In one embodiment, a maintenance base station for the target PSCell is a target SN.

In one embodiment, a maintenance base station for the target PSCell is a target S-NG-RAN node.

In one embodiment, a receiver for the first message is a maintenance base station for the second target cell, the second target cell being a source PSCell.

In one embodiment, a maintenance base station for the source PSCell is a source SN.

In one embodiment, a maintenance base station for the source PSCell is a source S-NG-RAN node.

In one embodiment, a receiver for the first message is a maintenance base station for the second target cell, the second target cell being a serving cell in a source SCG.

In one embodiment, a maintenance base station for the serving cell in the source SCG is a source SN.

In one embodiment, a maintenance base station for the serving cell in the source SCG is a source S-NG-RAN node.

In one embodiment, a receiver of the first message is the fourth node N04.

In one embodiment, the fourth node N04 is a maintenance base station for the second target cell, the second target cell being another target PCell.

In one embodiment, the fourth node N04 is a maintenance base station for the second target cell, the second target cell being a target PSCell.

In one embodiment, the fourth node N04 is a maintenance base station for the second target cell, the second target cell being a source PSCell.

In one embodiment, the fourth node N04 is a maintenance base station for the second target cell, the second target cell being a serving cell in a source SCG.

In one embodiment, a transmitter for the second message and a receiver for the first message are the same.

In one embodiment, the first message is used for a handover failure recovery.

In one embodiment, the first message is used for a connection failure recovery.

In one embodiment, the first message is an RRC message.

In one embodiment, a Signaling Radio Bearer (SRB) for the first message is SRB3.

In one embodiment, a Signaling Radio Bearer (SRB) for the first message is split SRB1.

In one embodiment, the first message is a MCGFailure-Information message.

In one embodiment, the first message comprises a field for indicating that a cause for the second handshake process is a handover failure (HOF).

In one embodiment, a value of the above-mentioned field in the first message can be set to a rlf or a hof, the hof being used to indicate the handover failure, and the rlf being used to indicate a Radio Link Failure (RLF).

In one embodiment, the first message comprises a measurement report of the third target cell.

In one embodiment, the first message comprises a PCI and a measurement result of the third target cell.

In one embodiment, a physCellId field in the first message indicates a PCI of the third target cell; a measResult in the first message indicates a measurement result of the third target cell.

In one embodiment, the first message comprises a MeasQuantityResults field, the MeasQuantityResults field comprising at least one of a measurement result of rsrp, or a measurement result of rsrq or a measurement result of sinr.

In one embodiment, the first message comprises at least one of a MeasResultListNR, or a physCellId, or a measResult, or a resultsSSB-Cell, or a resultsCSI-RS-Cell.

In one embodiment, the first message comprises at least one of a measId, or a measResultServingMOList, or a MeasResultServMOList.

In one embodiment, the second message is used for releasing an RRC connection; or, the second message is used for suspending an RRC connection; or, the second message is used for mobility control; or, the second message is used for bearer type transition; the first message and the second message are both RRC layer signalings; the first message comprises at least a measurement report.

In one embodiment, the second message is used for releasing an RRC connection; the first message and the second message are both RRC layer signalings; the first message comprises at least a measurement report.

In one subembodiment, the second message is a RRCRelease message.

In one subembodiment, the second message comprises CellReselectionPriorities.

In one subembodiment, the second message does not comprise a field of which the name includes SuspendConfig.

In one subembodiment, the second message does not comprise a field of which the name includes shortI-RNTI or a field of which the name includes Shord-RNTI-Value.

In one subembodiment, the second message comprises CellReselectionPriorities.

In one embodiment, the second message is used for suspending an RRC connection; the first message and the second message are both RRC layer signalings; the first message comprises at least a measurement report.

In one subembodiment, the second message is a RRCRelease message.

In one subembodiment, the second message comprises CellReselectionPriorities.

In one subembodiment, the second message comprises a field of which the name includes SuspendConfig.

In one subembodiment, the second message comprises an I-RNTI-Value or a ShortI-RNTI-Value.

In one embodiment, the second message is used for mobility control; the first message and the second message are both RRC layer signalings; the first message comprises at least a measurement report.

In one subembodiment, the second message is a RRCReconfiguration message.

In one subembodiment, the second message comprises a field of which the name includes ReconfigurationWithSync.

In one subembodiment, the second message comprises a ReconfigurationWithSync field.

In one subembodiment, the second message comprises a physCellId field, the physCellId field indicating a Physical Cell Identity (PCI) of the third target cell, the first message comprising a measurement report of the third target cell.

In one subembodiment, the second message comprises a newUE-Identity field, where a value of the newUE-Identity field indicates an RNTI of the first node U01 in the third target cell.

In one subembodiment, the second message comprises a t304 field, the t304 field indicating an expiration value of a timer T304.

In one embodiment, the second message is used for bearer type transition; the first message and the second message are both RRC layer signalings; the first message comprises at least a measurement report.

In one subembodiment, the second message is used to indicate a transition between an MCG bearer and an SCG bearer.

In one subembodiment, the second message is used to indicate a transition from an SCG bearer to an MCG bearer, and a transition from an MCG bearer to an SCG bearer.

In one embodiment, the second message being received during running of the second timer is used to determine that the second handshake process is successfully completed, while the second timer being expired is used to determine that the second handshake process is not successfully completed.

In one embodiment, as a response to the second message being received, the second handshake process is successfully completed.

In one embodiment, as a response to the second message being received, an action that the second handshake process is successfully completed is performed.

In one embodiment, as the second handshake process is initiated, the second timer is configured.

In one embodiment, as the second handshake process is initiated, the second timer is not configured.

In one embodiment, along with the first message, the second timer is started; herein, the first message and the second message are both RRC layer signalings; the first message comprises at least a measurement report.

In one embodiment, the second timer is for a case where the first message and the second message are both RRC layer signalings.

In one embodiment, the second timer is an RRC layer timer.

In one embodiment, the second timer is T316.

In one embodiment, the second timer is not T316.

In one embodiment, the second timer is a new timer in 3GPP TS 38.331, introduced at least after R18.

In one embodiment, the second timer's name includes T3.

In one embodiment, as a response to the second message being received, the second timer is stopped.

In one embodiment, as a response to the second handshake process being successfully completed, the second timer is stopped.

In one embodiment, the second timer being expired means that running time of the second timer reaches an expiration value of the second timer.

In one embodiment, the second timer being expired means that the value of the second timer reaches an expiration value of the second timer.

In one embodiment, an expiration value of the second timer is configurable.

In one embodiment, an expiration value of the second timer is pre-configured.

In one embodiment, an expiration value of the second timer is configured through an RRC message.

In one embodiment, the first message and the second message are both RRC layer signalings; the first message comprises at least a measurement report.

In one embodiment, the second timer being expired means that the second message is not received.

In one embodiment, the second timer being expired means that the second message is not received as the second timer is running.

In one embodiment, as a response to the handover request acknowledge message being received by the second node N02, the second node N02 does not release a source SN.

In one subembodiment, as a response to the handover request message being received by the third node N03, the third node N03 adds a target SN.

In one subembodiment, as a response to the handover request message being received by the third node N03, the third node N03 does not add a target SN.

In one embodiment, as a response to the handover request message being received by the third node N03, the third node N03 adds a target SN.

In one subembodiment, as a response to the handover request acknowledge message being received by the second node N02, the second node N02 releases a source SN.

In one subembodiment, as a response to the handover request acknowledge message being received by the second node N02, the second node N02 does not release a source SN.

In one subsidiary embodiment of the above subembodiment, the source SN not being configured is used to determine that the second node N02 does not release the source SN.

In one subsidiary embodiment of the above subembodiment, the source SN is configured and released.

In one embodiment, the first message is a physical layer signaling; the first message comprises at least a random access preamble.

In one embodiment, as a response to the handover request acknowledge message being received by the second node N02, the second node N02 releases a source SN.

In one embodiment, the first message is transmitted on a physical layer.

In one embodiment, the first message is generated on a physical layer.

In one embodiment, the first message is a random access preamble.

In one embodiment, the first message is used for a random access procedure.

In one embodiment, the first message is a last random access preamble in a random access procedure.

In one embodiment, the second message is used to determine that a random access procedure to which the first message belongs is successfully completed.

In one embodiment, the second message comprises a PDCCH.

In one embodiment, the second message comprises a valid downlink assignment received on a PDCCH.

In one embodiment, the second message comprises a valid downlink assignment received on a PDCCH identified by a RA-RNTI.

In one embodiment, the second message comprises a valid downlink assignment received on a PDCCH identified by a MSGB-RNTI.

In one embodiment, the downlink assignment that is valid comprises a MAC RAR.

In one embodiment, the downlink assignment that is valid comprises a fallbackRAR.

In one embodiment, a second message is monitored through a RNTI assigned by the second target cell.

In one subembodiment, the RNTI allocated by the second target cell is a C-RNTI.

In one subembodiment, the RNTI allocated by the second target cell is a RA-RNTI.

In one subembodiment, the RNTI allocated by the second target cell is a MSGB-RNTI.

In one embodiment, monitoring a second message comprises: a PDCCH identified by a RA-RNTI being monitored determining whether a valid downlink assignment is received.

In one embodiment, monitoring a second message comprises: determining whether the second message exists or not.

In one embodiment, monitoring a second message comprises: determining whether the second message exists or not according to CRC.

In one embodiment, a second message is monitored as a ra-ResponseWindow is running.

In one embodiment, a second message is monitored as a msgB-ResponseWindow is running.

In one embodiment, a second message is monitored as a ra-ContentionResolutionTimer is running.

In one embodiment, if the second message is received, it is assumed that a random access procedure to which the first message belongs is successfully completed.

In one embodiment, the first message is used for triggering the second message.

In one embodiment, as a response to the first message being transmitted, the second message is received.

In one embodiment, a type of a random access procedure to which the first message belongs is 4-stepRA, the first message being used for CFRA, and the second message comprising a MAC RAR; a type of a random access procedure to which the first message belongs is 2-stepRA, the first message being used for CFRA, and the second message comprising a fallbackRAR; a type of a random access procedure to which the first message belongs is 2-stepRA, the first message being used for CBRA, and the second message comprising a successRAR.

In one embodiment, as a response to the first message being transmitted, a Message 2 (Msg2) is received; as a response to the Msg2 being received, a Msg3 is transmitted; and as a response to the Msg3 being transmitted, the second message is received; a type of a random access procedure to which the first message belongs is 4-stepRA, the first message being used for CBRA.

In one subembodiment, the Msg2 comprises a MAC RAR; the Msg2 indicates a UL grant.

In one subembodiment, the Msg3 comprises a C-RNTI MAC CE, the C-RNTI MAC CE comprising a first RNTI.

In one subembodiment, the second message is a PDCCH transmission addressed to the first RNTI.

In one subembodiment, the second message comprises a UL grant for a new transmission.

In one embodiment, as a response to the first message being transmitted, a Message B (MsgB) is received; as a response to the MsgB being received, a Msg3 is transmitted; and as a response to the Msg3 being transmitted, the second message is received; a type of a random access procedure to which the first message belongs is 4-stepRA, the first message being used for CBRA.

In one subembodiment, the MsgB is a fallbackRAR; the MsgB indicates an UL grant.

In one subembodiment, the Msg3 comprises a C-RNTI MAC CE, the C-RNTI MAC CE comprising a first RNTI.

In one subembodiment, the second message is a PDCCH transmission addressed to the second RNTI.

In one subembodiment, the second message comprises a UL grant for a new transmission.

In one embodiment, the second RNTI is a C-RNTI.

In one embodiment, the second RNTI is a C-RNTI of the first node U01 in the second target cell.

In one embodiment, the second RNTI is a RNTI assigned by a maintenance base station for the second target cell.

In one embodiment, when the second message is received, a PREAMBLE_TRANSMISSION_COUNTER hasn't reached preambleTransMax+1.

In one embodiment, within a time interval from the first message being transmitted to the second message being received, a PREAMBLE_TRANSMISSION_COUNTER is not set to 1.

In one embodiment, the second message is received.

In one embodiment, the second message is not received.

In one embodiment, the phrase that the first handshake process not being successfully completed is used to trigger the first message comprises: as a response to the first handshake process not being successfully completed, the first message is transmitted.

In one embodiment, the phrase that the first handshake process not being successfully completed is used to trigger the first message comprises: as a response to the PCell handover failure, the first message is transmitted.

In one embodiment, the phrase that the first handshake process not being successfully completed is used to trigger the first message comprises: as a response to the first timer being expired, the first message is transmitted.

In one embodiment, the phrase that the first handshake process not being successfully completed is used to trigger the first message comprises: as a response to a random access procedure to which the first radio signal belongs not being successfully completed, the first message is transmitted.

In one embodiment, a start time of the first handshake process is earlier than a start time of the second handshake process; the first handshake process not being successfully completed is used to trigger the first message; the first message is transmitted on the second target cell; as a response to the first message being transmitted, the second message is monitored; whether the second message is received is used to determine whether the second handshake process is successfully completed; the second message being received is used to determine that the second handshake process is successfully completed, while the second message not being received is used to determine that the second handshake process is not successfully completed; the first message and the second message are both RRC layer signalings; the first message comprises at least a measurement report.

In one embodiment, a start time of the first handshake process is no later than a start time of the second handshake process; the first message is transmitted on the second target cell; as a response to the first message being transmitted, the second message is monitored; whether the second message is received is used to determine whether the second handshake process is successfully completed; the second message being received is used to determine that the second handshake process is successfully completed, while the second message not being received is used to determine that the second handshake process is not successfully completed; the first message is a physical layer signaling; the first message comprises at least a random access preamble.

In one embodiment, the first message is received by the fourth node N04.

In one embodiment, the first message is not received by the fourth node N04.

In one embodiment, the second message is transmitted by the fourth node N04.

In one embodiment, the second message is not transmitted by the fourth node N04.

Embodiment 8

Figure 8:
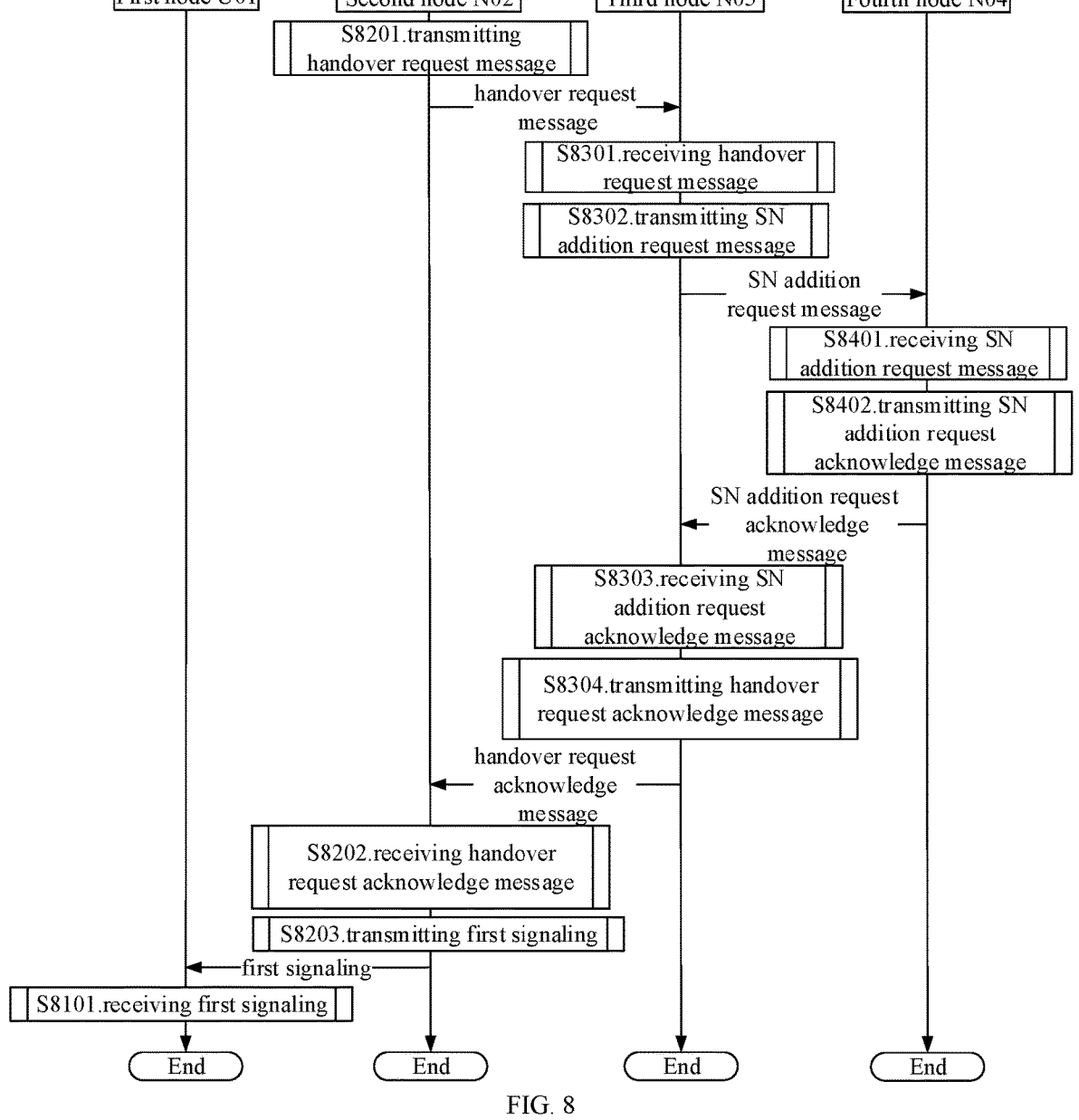
FIG. 8 illustrates a flowchart of radio signal transmission of a first signaling according to one embodiment of the present application.

Embodiment 8 illustrates a flowchart of radio signal transmission of a first signaling according to one embodiment of the present application, as shown in FIG. 8. It should be particularly noted that the sequence illustrated herein does not set any limit to the signal transmission order or implementation order in the present application.

The first node U01 receives a first signaling in step S8101, the first signaling being used for mobility control, and the first signaling being used for indicating at least a first target cell and a second target cell.

The second node N02 transmits a handover request message in step S8201; receives a handover request acknowledge message in step S8202; and transmits a first signaling in step S8203.

The third node N03 receives a handover request message in step S8301; as a response to the handover request message being received, transmits an SN addition request message in step S8302; and as a response to the SN addition request message being transmitted, receives an SN addition request acknowledge message in step S8303; and transmits a handover request acknowledge message in step S8304.

The fourth node N04 receives the SN addition request message in step S8401; and as a response to the SN addition request message being received, transmits the SN addition request acknowledge message in step S8402.

In Embodiment 8, the handover request message is used to trigger an SN addition request message; the SN addition request message is used to trigger an SN addition request acknowledge message; the SN addition request acknowledge message is used to trigger the handover request acknowledge message; a handover request message is used to trigger a handover request acknowledge message; the handover request acknowledge message is used to trigger the first signaling.

In one embodiment, the second node N02 is a maintenance base station for the first cell, the first cell being a source PCell.

In one embodiment, the third node N03 is a maintenance base station for the first target cell, the first target cell being a target PCell.

In one embodiment, the fourth node N04 is a maintenance base station for the second target cell, the second target cell being a target PSCell.

In one embodiment, the handover request message is transmitted via an Xn interface.

In one embodiment, the handover request message is transmitted via an X2 interface.

In one embodiment, the handover request acknowledge message is transmitted via an Xn interface.

In one embodiment, the handover request acknowledge message is transmitted via an X2 interface.

In one embodiment, as a response to the handover request message being transmitted by the second node N02, the second node N02 receives the handover request acknowledge message.

In one embodiment, as a response to the handover request message being transmitted by the second node N02, the second node N02 receives the handover request acknowledge message as a timer $TXn_{RELOCprep}$ is running.

In one embodiment, as a response to the handover request message being received by the third node N03, the third node N03 transmits the handover request acknowledge message.

In one embodiment, as a response to the handover request acknowledge message being received by the second node N02, the second node N02 transmits the first signaling.

In one embodiment, the handover request message directly triggers the handover request acknowledge message.

In one embodiment, the handover request message indirectly triggers the handover request acknowledge message.

In one embodiment, the handover request message is used for requesting to the third node N03 for preparation of resources for handover.

In one embodiment, the handover request message comprises an Identity (ID) of the first target cell.

In one embodiment, the handover request message comprises a C-RNTI of the first node U01 in the second node N02.

In one embodiment, the handover request acknowledge message is used for notifying the second node N02 of resources prepared in the third node N03.

In one embodiment, the handover request acknowledge message comprises a HandoverCommand message.

In one embodiment, the handover request acknowledge message comprises a HandoverCommand message, the HandoverCommand message comprising a RRCReconfiguration message or a RRCConnectionReconfiguration message.

In one embodiment, the phrase that the handover request acknowledge message is used to trigger the first signaling comprises: the handover request acknowledge message comprises a HandoverCommand message, the Handover-Command message being used to generate the first signaling.

In one embodiment, the phrase that the handover request acknowledge message is used to trigger the first signaling comprises: the handover request acknowledge message comprises a HandoverCommand message, the first signaling comprising at least part of the HandoverCommand message.

In one embodiment, the phrase that the handover request acknowledge message is used to trigger the first signaling comprises: the handover request acknowledge message comprises a HandoverCommand message, the Handover-Command message comprising a RRCReconfiguration message; the first signaling comprises the RRCReconfiguration message.

In one embodiment, the phrase that the handover request acknowledge message is used to trigger the first signaling comprises: the handover request acknowledge message comprises a HandoverCommand message, the Handover-Command message comprising a RRCConnectionRecon-figuration message; the first signaling comprises the RRC-ConnectionReconfiguration message.

In one embodiment, the handover request acknowledge message comprises a Global ID of the first target cell.

In one embodiment, the handover request message is a HANDOVER REQUEST message; the handover request acknowledge message is a HANDOVER REQUEST ACKNOWLEDGE message.

In one embodiment, the handover request message is a HANDOVER REQUEST message, the HANDOVER REQUEST message comprising a Conditional Handover Information Request IE; the handover request acknowledge message is a HANDOVER REQUEST ACKNOWLEDGE message, the HANDOVER REQUEST ACKNOWLEDGE message comprising a Conditional Handover Information Acknowledge IE.

In one embodiment, the SN addition request message is transmitted via an Xn interface.

In one embodiment, the SN addition request message is transmitted via an X2 interface.

In one embodiment, the SN addition request acknowledge message is transmitted via an Xn interface.

In one embodiment, the SN addition request acknowledge message is transmitted via an X2 interface.

In one embodiment, the SN addition request message is used for requesting for preparing resources used for dual connectivity operation of the first node U01.

In one embodiment, the SN addition request message is used for requesting for adding a target SN.

In one embodiment, the SN addition request message comprises a SN Addition Request message.

In one embodiment, the SN addition request message comprises a S-NODE ADDITION REQUEST message.

In one embodiment, the SN addition request message comprises a SN UE X2AP ID.

In one embodiment, the SN addition request message comprises a PDU Session ID.

In one embodiment, the SN addition request message comprises a S-NG-RAN node Security Key.

In one embodiment, the SN addition request acknowledge message is used for acknowledging to the third node N03 addition preparation by the fourth node N04.

In one embodiment, the SN addition request acknowledge message comprises a SN Addition Request Acknowledge message.

In one embodiment, the SN addition request acknowledge message comprises a S-NODE ADDITION REQUEST ACKNOWLEDGE message.

In one embodiment, the SN addition request acknowledge message comprises an indication of full RRC configuration or delta RRC configuration.

In one embodiment, the SN addition request acknowledge message comprises a PDU Session Resources Admitted To Be Added List.

In one embodiment, the SN addition request acknowledge message comprises a M-NG-RAN node UE XnAP ID.

In one embodiment, the SN addition request acknowledge message comprises a PDU Session ID.

In one embodiment, the SN addition request acknowledge message comprises a CG-Config message.

In one embodiment, the phrase that the handover request message indirectly triggers the handover request acknowledge message comprises that the handover request message is used to trigger an SN addition request message; the SN addition request message is used to trigger an SN addition request acknowledge message; the SN addition request acknowledge message is used to trigger the handover request acknowledge message.

In one embodiment, as a response to the handover request message being received by the third node N03, the third node N03 transmits the SN addition request message to the fourth node N04; as a response to the SN addition request message being received by the fourth node N04, the fourth node N04 transmits the SN addition request acknowledge message to the third node N03; as a response to the SN addition request acknowledge message being received by the third node N03, the third node N03 transmits the handover request acknowledge message to the second node N02; as a response to the handover request acknowledge message being received by the second node N02, the second node N02 transmits the first signaling to the first node U01.

Embodiment 9

Figure 9:
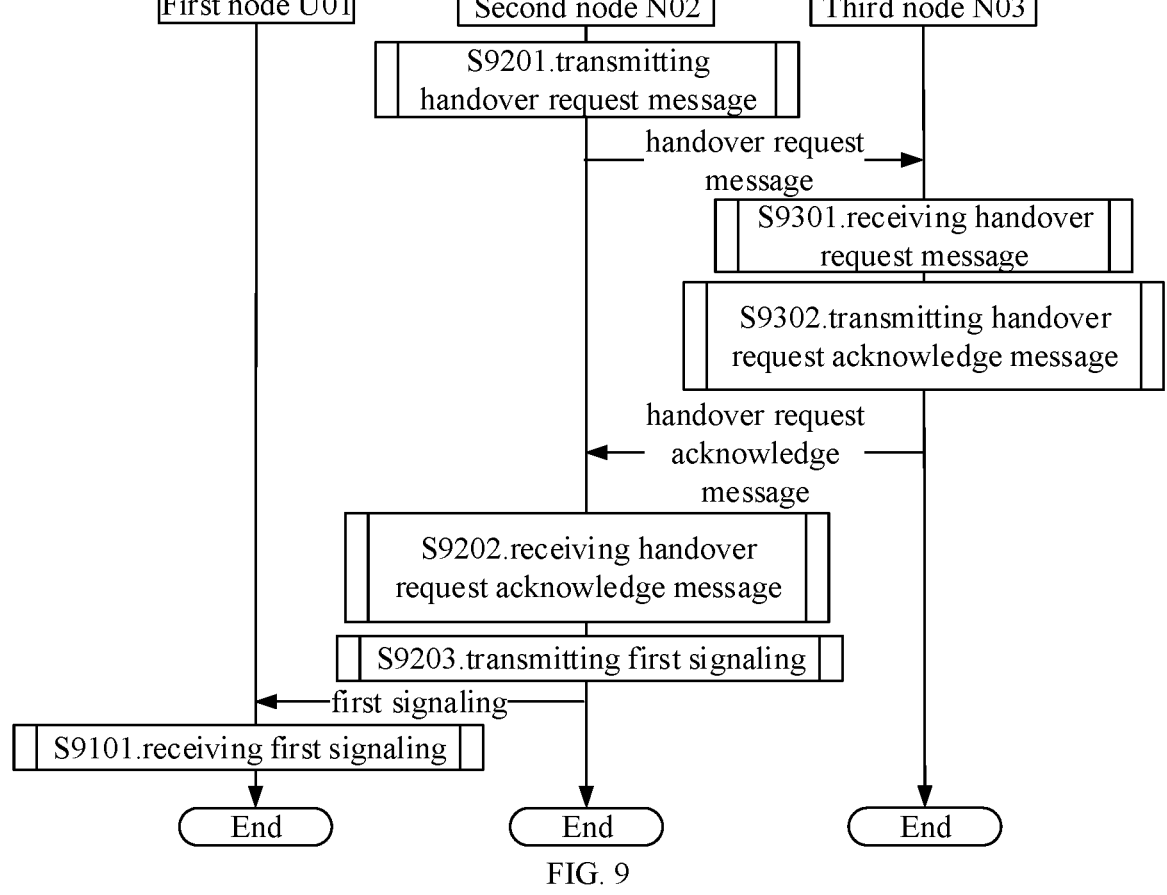
FIG. 9 illustrates a flowchart of radio signal transmission of a first signaling according to another embodiment of the present application.

Embodiment 9 illustrates a flowchart of radio signal transmission of a first signaling according to another embodiment of the present application, as shown in FIG. 9. It should be particularly noted that the sequence illustrated herein does not set any limit to the signal transmission order or implementation order in the present application.

The first node U01 receives a first signaling in step S9101, the first signaling being used for mobility control, and the first signaling being used for indicating at least a first target cell and a second target cell.

The second node N02 transmits a handover request message in step S9201; receives a handover request acknowledge message in step S9202; and transmits a first signaling in step S9203.

The third node N03 receives a handover request message in step S9301; and transmits a handover request acknowledge message in step S9302.

In Embodiment 9, a handover request message is used to trigger a handover request acknowledge message; the handover request acknowledge message is used to trigger the first signaling.

In one embodiment, the second node N02 is a maintenance base station for the first cell, the first cell being a source PCell.

In one embodiment, the third node N03 is a maintenance base station for the first target cell, the first target cell being a target PCell.

In one embodiment, the fourth node in the present application is configured.

In one embodiment, the fourth node in the present application is a maintenance base station for the second target cell, the second target cell being a source PSCell.

In one embodiment, as a response to the handover request message being received by the third node N03, the third node N03 adds a target SN.

In one embodiment, as a response to the handover request message being received by the third node N03, the third node N03 does not add a target SN.

In one embodiment, as a response to the handover request acknowledge message being received by the second node N02, the second node N02 releases a source SN.

In one embodiment, as a response to the handover request acknowledge message being received by the second node N02, the second node N02 does not release a source SN.

Embodiment 10

Figure 10:
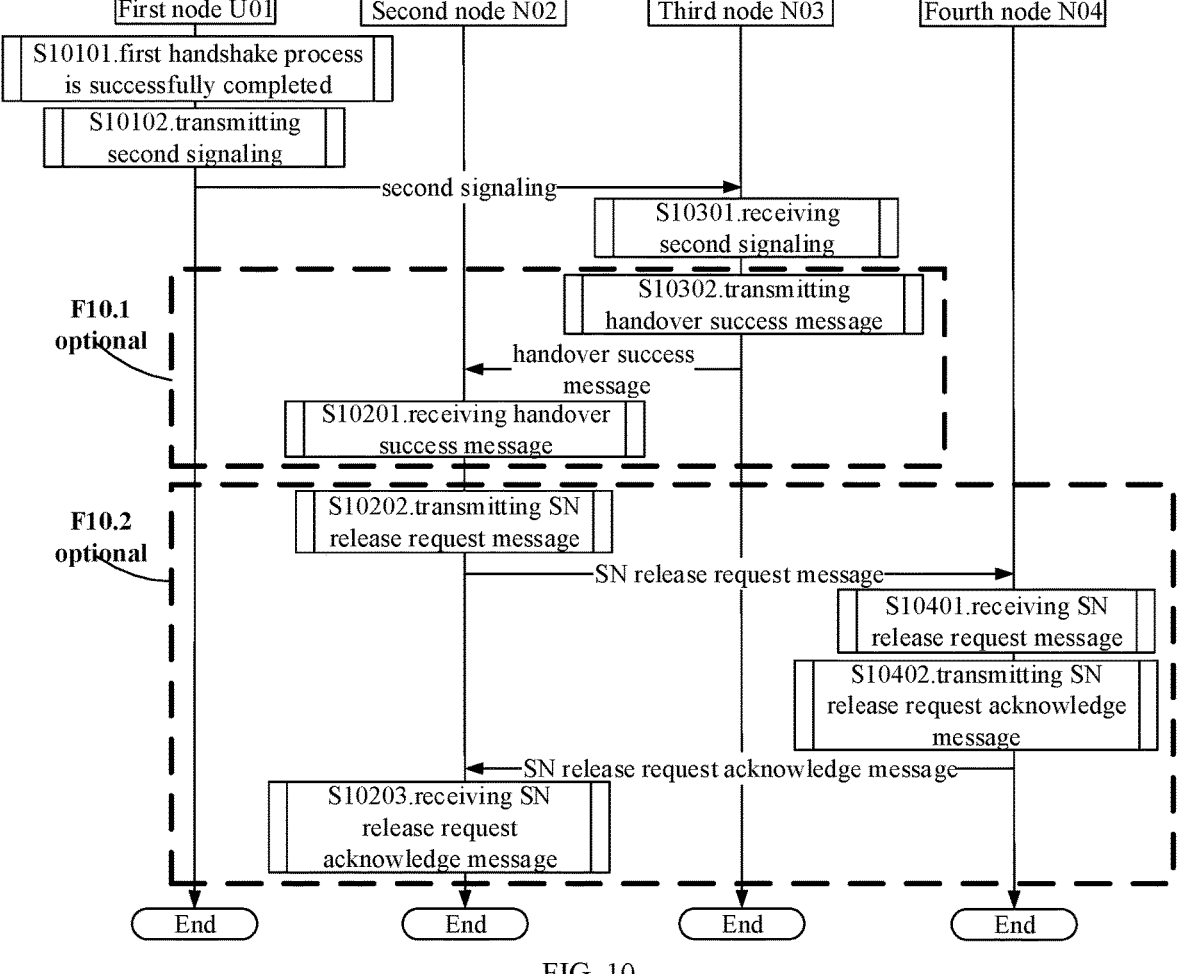
FIG. 10 illustrates a flowchart of radio signal transmission of a first handshake process being successfully completed according to one embodiment of the present application.

Embodiment 10 illustrates a flowchart of radio signal transmission of a first handshake process being successfully completed according to one embodiment of the present application, as shown in FIG. 10. It should be particularly noted that the sequence illustrated herein does not set any limit to the signal transmission order or implementation order in the present application.

The first node U01 determines that a first handshake process is successfully completed in step S10101; and transmits a second signaling in step S10102.

The second node N02 receives a handover success message in step S10201; transmits an SN release request message in step S10202; and, as a response to the SN release request message being transmitted, receives an SN release request acknowledge message in step S10203.

The third node N03 receives a second signaling in step S10301; as a response to the second signaling being received, transmits a handover success message in step S10302.

The fourth node N04 receives an SN release request message, where a first field in the SN release request message is used to indicate the PCell handover in step S10401; as a response to the SN release request message being received, transmits an SN release request acknowledge message in step S10402.

In Embodiment 10, the handover success message is used to trigger an SN release request message; the handover success message is used for notifying that the PCell handover is successfully completed; a first field in the SN release request message is used to indicate the PCell handover; the second signaling is used to acknowledge that the PCell handover is successfully completed.

In one embodiment, the second node N02 is a maintenance base station for the first cell, the first cell being a source PCell.

In one embodiment, the third node N03 is a maintenance base station for the first target cell, the first target cell being a target PCell.

In one embodiment, the fourth node N04 is a maintenance base station for the second target cell, the second target cell being a source PSCell.

In one embodiment, the fourth node N04 is a maintenance base station for the second target cell.

In one embodiment, the second signaling is a RRCReconfigurationComplete message.

In one embodiment, the first signaling is used to trigger the second signaling.

In one embodiment, the PCell handover being performed is used to trigger the second signaling.

In one embodiment, as a response to the second signaling being received, the handover success message is transmitted.

In one embodiment, the SN release request message is transmitted via an Xn interface.

In one embodiment, the SN release request message is transmitted via an X2 interface.

In one embodiment, the SN release request acknowledge message is transmitted via an Xn interface.

In one embodiment, the SN release request acknowledge message is transmitted via an X2 interface.

In one embodiment, the SN release request message is an SN Release Request Message.

In one embodiment, the SN release request message is a S-NODE RELEASE REQUEST message.

In one embodiment, the SN release request message is used for requesting release of resources.

In one embodiment, the SN release request message comprises a UE Context Kept Indicator for indicating that the fourth node N04 retains a UE Context of the first node U01.

In one embodiment, the SN release request message does not comprise a UE Context Kept Indicator.

In one embodiment, the SN release request acknowledge message is used for acknowledging the request for the release of resources.

In one embodiment, the SN release request acknowledge message is S-NODE RELEASE REQUEST ACKNOWLEDGE message.

In one embodiment, the SN release request acknowledge message comprises a PDU sessions To Be Released List.

In one embodiment, the first field is a field in a Cause IE.

In one embodiment, the first field is a Radio Network Layer Cause field in a Cause IE.

In one embodiment, the first field is used to indicate MCG mobility.

In one embodiment, a value of the first field is set as MN mobility.

In one embodiment, as a response to the handover success message being received by the second node N02, the second node N02 transmits the SN release request message; as a response to the SN release request message being received by the fourth node N04, the fourth node N04 transmits the SN release request acknowledge message.

In one embodiment, the dotted-line box F10.1 is optional.

In one embodiment, the dotted-line box F10.1 exists.

In one embodiment, the dotted-line box F10.1 does not exist.

In one embodiment, the dotted-line box F10.2 is optional.

In one embodiment, the dotted-line box F10.2 exists.

In one embodiment, the dotted-line box F10.2 does not exist.

In one embodiment, at least the former of the dotted-line box F10.1 or the dotted-line box F10.2 exists.

In one embodiment, neither of the dotted-line box F10.1 and the dotted-line box F10.2 exists.

Embodiment 11

Figure 11:
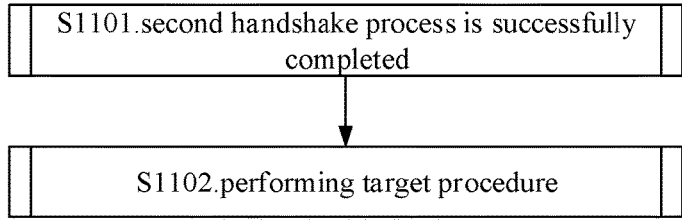
FIG. 11 illustrates a flowchart of a second handshake process being successfully completed according to one embodiment of the present application.

Embodiment 11 illustrates a flowchart of a second handshake process being successfully completed according to one embodiment of the present application, as shown in FIG. 11.

In Embodiment 11, it is determined that a second handshake process is successfully completed in step S1101; in step S1102, as a response to the second handshake process being successfully completed, a target procedure is performed.

In one embodiment, if the first message is a physical layer signaling; the first message comprises at least a random access preamble, the action of performing a target procedure comprising: initiating a first recovery procedure, the action of initiating the first recovery procedure comprising at least one of:

transmitting a MCGFailureInformation message;
suspending all SRB(s) and DRB(s) other than SRB0 in an MCG transmission;
resetting a MAC entity of an MCG.

In one embodiment, if the second message is used for releasing an RRC connection, the action of performing a target procedure comprises: releasing an RRC connection, the action of releasing the RRC connection comprising at least one of:

entering an RRC_IDLE state;
resetting a MAC entity;
releasing all radio resources;
releasing an RLC entity;
releasing a BAP entity;
releasing MAC configuration and associated PDCP entity and SDAP for all established RBs and BH RLC channels.

In one embodiment, if the second message is used for suspending an RRC connection, the action of performing a target procedure comprises: suspending an RRC connection, the action of suspending the RRC connection comprising at least one of:

applying suspendConfig;
resetting a MAC entity;
re-establishing an RLC entity of SRB1;
entering an RRC_INACTIVE state;
suspending all SRB(s) other than SRB0.

In one embodiment, if the second message is used for mobility control, the action of performing a target procedure comprises: performing a handover procedure according to the second message, the action of performing the handover procedure according to the second message comprising at least one of:

performing reconfiguration with sync according to the second message;
starting T304, and setting the T304's value to a value of a t304 in the second message;
starting synchronization with a downlink of the third target cell;
applying BCCH configuration of the third target cell;
initiating a random access procedure on the third target cell.

In one embodiment, if the second message is used for Bearer Type transition, the action of performing a target procedure comprises: performing a bearer type transition procedure, the action of performing the bearer type transition procedure comprising at least one of:

taking the second target cell as a PCell and the first target cell as a PSCell;
taking a cell group to which the first target cell belongs as an MCG, and a cell group to which the second target cell belongs as an SCG.

Embodiment 12

Embodiment 12 illustrates a flowchart of any of a first handshake process or a second handshake process not being successfully completed according to one embodiment of the present application, as shown in FIG. 12.

The first node U01 determines in step S12101 that any one of the first handshake process or the second handshake process is not successfully completed; and in step S12102, as a response to the RRC connection re-establishment procedure being initiated, transmitting a third signaling; receives a fourth signaling in step S12103; and transmits a fifth signaling in step S12103.

The fifth node N05 receives the third signaling in step S12501; transmits the fourth signaling in step S12502; and receives the fifth signaling in step S12503.

In Embodiment 12, the third signaling, the fourth signaling and the fifth signaling are used for the RRC connection re-establishment procedure; the third signaling is used for requesting an RRC connection re-establishment; the third signaling triggers the fourth signaling; and the fourth signaling triggers the fifth signaling.

In one embodiment, the fifth node N05 is a maintenance base station for a cell determined by Cell Selection.

In one embodiment, the fifth node N05 is the same as one of the second node N02 in the present application, or the third node in the present application or the fourth node in the present application.

In one embodiment, the fifth node N05 is different from any of the second node N02 in the present application, or the third node in the present application or the fourth node in the present application.

In one embodiment, the first node U01 is not configured with a CHO candidate cell.

In one embodiment, the first node U01 is configured with at least one CHO candidate cell, and not configured with attemptCondReconfig.

In one embodiment, the first node U01 is configured with at least one CHO candidate cell, and with attemptCondReconfig, and a cell determined by Cell Selection is not one of the at least one CHO candidate cell.

In one embodiment, the first node U01 is not configured with a DAPS Bearer.

In one embodiment, Access Stratum (AS) security of the first node U01 is activated.

In one embodiment, an SRB2 and at least one DRB are set up.

In one embodiment, an SRB2 is set up, or at least one DRB is set up.

In one embodiment, AS security of the first node U01 is activated, and an SRB2 or at least one DRB is set up.

In one embodiment, the third signaling is used for requesting an RRC connection re-establishment.

In one embodiment, the fourth signaling is used for re-establishing or setting up an SRB1.

In one embodiment, the fifth signaling is used for acknowledging that an RRC connection re-establishment is successfully completed or an RRC connection establishment is completed.

In one embodiment, as a response to any one of the first handshake process or the second handshake process not being successfully completed, the RRC connection re-establishment procedure is initiated.

In one embodiment, the action of performing an RRC connection re-establishment procedure comprises: initiating the RRC connection re-establishment procedure.

In one embodiment, the action of performing an RRC connection re-establishment procedure comprises: at least one of transmitting the third signaling, or receiving the fourth signaling or transmitting the fifth signaling.

In one embodiment, the third signaling is an RRC message.

In one embodiment, a Signaling Radio Bearer (SRB) for the third signaling is SRB0.

In one embodiment, the third signaling comprises a reestablishmentCause IE, the reestablishmentCause IE indicating a cause for triggering the RRC connection re-establishment.

In one embodiment, the third signaling comprises a ue-Identity field, the ue-Identity field indicating a Cell RNTI (C-RNTI) of the first node U01 in the first cell, a PCI of the first cell and a ShortMAC-I.

In one embodiment, the third signaling is a RRCReestablishmentRequest message, the fourth signaling is a RRCReestablishment message, and the fifth signaling is a RRCReestablishmentComplete message.

In one embodiment, the third signaling is a RRCReestablishmentRequest message, the fourth signaling is a RRCSetup message, and the fifth signaling is a RRCSetupComplete message.

In one embodiment, the fourth signaling is used for re-establishing an SRB1.

In one embodiment, the fourth signaling is used for establishing an SRB1.

In one embodiment, the first cell is a source cell of the first node U01.

In one embodiment, the first cell is a PCell of the first node U01 before failing the first handshake process.

Embodiment 13

FIG. 13 illustrates a structure block diagram of a processing device used in a first node according to one embodiment of the present application; as shown in FIG. 13. In FIG. 13, a processing device 1300 in a first node comprises a first receiver 1301 and a first transmitter 1302.

The first receiver 1301 receives a first signaling, the first signaling being used for mobility control, and the first signaling being used for indicating at least a first target cell and a second target cell; and a first transceiver, performing a first handshake process, the first handshake process being for the first target cell; and performing a second handshake process, the second handshake process being for the second target cell; and determining whether to initiate a Radio Resource Control (RRC) connection re-establishment procedure according to whether at least one of the first handshake process or the second handshake process is successfully completed.

In Embodiment 13, at least a former one of the first handshake process or the second handshake process is used for a Primary Cell (PCell) handover; a start time of the first handshake process is no later than a start time of the second handshake process; the action of determining whether to initiate an RRC connection re-establishment procedure according to whether at least one of the first handshake process or the second handshake process is successfully completed comprises: any one of the first handshake process or the second handshake process not being successfully completed is used to determine to initiate the RRC connection re-establishment procedure; at least one of the first handshake process or the second handshake process being successfully completed is used to determine not to initiate the RRC connection re-establishment procedure.

In one embodiment, the first transmitter 1302 transmits a first radio signal on the first target cell; and the first receiver 1301 monitors a second radio signal on the first target cell; herein, the first radio signal is used to trigger the second radio signal; whether the second radio signal is received is used to determine whether the first handshake process is successfully completed; the second radio signal being received is used to determine that the first handshake process is successfully completed, while the second radio signal not being received is used to determine that the first handshake process is not successfully completed; the first radio signal comprises at least a random access preamble.

In one embodiment, the first transmitter 1302 starts a first timer along with initiation of the PCell handover; the second radio signal being received during running of the first timer is used to determine that the first handshake process is successfully completed; the first timer being expired is used to determine that the first handshake process is not successfully completed.

In one embodiment, the second handshake process comprises: the first transmitter 1302, transmitting a first message on the second target cell; and the first receiver 1301, as a response to the first message being transmitted, monitoring a second message; herein, whether the second message is received is used to determine whether the second handshake process is successfully completed; the second message being received is used to determine that the second handshake process is successfully completed, while the second message not being received is used to determine that the second handshake process is not successfully completed.

In one embodiment, the first transmitter 1302 starts a second timer along with the first message; the second message being received during running of the second timer is used to determine that the second handshake process is successfully completed; the second timer being expired is used to determine that the second handshake process is not successfully completed.

In one embodiment, the first message and the second message are both RRC layer signalings; the first message comprises at least a measurement report.

In one embodiment, the first message is a physical layer signaling; the first message comprises at least a random access preamble.

In one embodiment, the first handshake process not being successfully completed is used to trigger the first message.

In one embodiment, the first transmitter 1302, as a response to the first handshake process being successfully completed, transmits a second signaling, the second signaling being used to acknowledge that the PCell handover is successfully completed.

In one embodiment, the second signaling is used to trigger a handover success message; the handover success message is used for notifying that the PCell handover is successfully completed.

In one embodiment, the handover success message is used to trigger an SN release request message; the release request message is used to trigger an SN release request acknowledge message; a first field in the SN release request message is used to indicate the PCell handover.

In one embodiment, the first transceiver, as a response to the second handshake process being successfully completed, performs a target procedure.

In one embodiment, a handover request message is used to trigger a handover request acknowledge message; the handover request acknowledge message is used to trigger the first signaling.

In one embodiment, the handover request message is used to trigger an SN addition request message; the SN addition request message is used to trigger an SN addition request acknowledge message; the SN addition request acknowledge message is used to trigger the handover request acknowledge message.

In one embodiment, the first transmitter 1302, as a response to the RRC connection re-establishment procedure being initiated, transmits a third signaling; the first receiver 1301, as a response to the third signaling being transmitted, receives a fourth signaling; the first transmitter 1302, as a response to the fourth signaling being received, transmits a fifth signaling; herein, the third signaling, the fourth signaling and the fifth signaling are used for the RRC connection re-establishment procedure; the third signaling is used for requesting an RRC connection re-establishment.

In one embodiment, the first receiver 1301 comprises the antenna 452, the receiver 454, the multi-antenna receiving processor 458, the receiving processor 456, the controller/processor 459, the memory 460 and the data source 467 in FIG. 4 of the present application.

In one embodiment, the first receiver 1301 comprises the antenna 452, the receiver 454, the multi-antenna receiving processor 458 and the receiving processor 456 in FIG. 4 of the present application.

In one embodiment, the first receiver 1301 comprises the antenna 452, the receiver 454 and the receiving processor 456 in FIG. 4 of the present application.

In one embodiment, the first transmitter 1302 comprises the antenna 452, the transmitter 454, the multi-antenna transmitting processor 457, the transmitting processor 468, the controller/processor 459, the memory 460 and the data source 467 in FIG. 4 of the present application.

In one embodiment, the first transmitter 1302 comprises the antenna 452, the transmitter 454, the multi-antenna transmitting processor 457 and the transmitting processor 468 in FIG. 4 of the present application.

In one embodiment, the first transmitter 1302 comprises the antenna 452, the transmitter 454 and the transmitting processor 468 in FIG. 4 of the present application.

In one embodiment, the first transceiver comprises at least one of the first receiver 1301 or the first transmitter 1302.

Embodiment 14

Embodiment 14 illustrates a structure block diagram of a processing device used in a second node according to one embodiment of the present application; as shown in FIG. 14. In FIG. 14, a processing device 1400 in a second node comprises a second transmitter 1401 and a second receiver 1402.

The second transmitter 1401 transmits a first signaling, the first signaling being used for mobility control, and the first signaling being used for indicating at least a first target cell and a second target cell;

in Embodiment 14, a first handshake process is performed, the first handshake process being for the first target cell; and a second handshake process is performed, the second handshake process being for the second target cell; and whether at least one of the first handshake process or the second handshake process is successfully completed is used to determine an RRC connection re-establishment procedure is to be initiated; at least a former one of the first handshake process or the second handshake process is used for a PCell handover; a start time of the first handshake process is no later than a start time of the second handshake process; the action of determining whether to initiate an RRC connection re-establishment procedure according to whether at least one of the first handshake process or the second handshake process is successfully completed comprises: any one of the first handshake process or the second handshake process not being successfully completed is used to determine to initiate the RRC connection re-establishment procedure; at least one of the first handshake process or the second handshake process being successfully completed is used to determine not to initiate the RRC connection re-establishment procedure.

In one embodiment, the second transmitter 1401 transmits a handover request message; the second receiver 1402 receives a handover request acknowledge message; herein, the handover request message is used to trigger the handover request acknowledge message; the handover request acknowledge message is used to trigger the first signaling.

In one embodiment, the handover request message is used to trigger an SN addition request message; the SN addition request message is used to trigger an SN addition request acknowledge message; the SN addition request acknowledge message is used to trigger the handover request acknowledge message.

In one embodiment, the second transmitter 1401 transmits an SN release request message, where a first field in the SN release request message is used to indicate the PCell handover; the second receiver 1402, as a response to the SN release request message being transmitted, receives an SN release request acknowledge message.

In one embodiment, the second receiver 1402 receives a handover success message; the handover success message is used to trigger an SN release request message; the handover success message is used for notifying that the PCell handover is successfully completed.

In one embodiment, as a response to the first handshake process being successfully completed, a second signaling is transmitted, the second signaling being used to acknowledge that the PCell handover is successfully completed; the second signaling is used to trigger the handover success message.

In one embodiment, the first handshake process comprises: a first radio signal being transmitted on the first target cell; and a second radio signal being monitored on the first target cell; the first radio signal is used to trigger the second radio signal; whether the second radio signal is received is used to determine whether the first handshake process is successfully completed; the second radio signal being received is used to determine that the first handshake process is successfully completed, while the second radio signal not being received is used to determine that the first handshake process is not successfully completed; the first radio signal comprises at least a random access preamble.

In one embodiment, along with the PCell handover being initiated, a first timer is started; the second radio signal being received during running of the first timer is used to determine that the first handshake process is successfully completed; the first timer being expired is used to determine that the first handshake process is not successfully completed.

In one embodiment, the second handshake process comprises: a first message being transmitted on the second target cell; as a response to the first message being transmitted, a second message being monitored; whether the second message is received is used to determine whether the second handshake process is successfully completed; the second message being received is used to determine that the second handshake process is successfully completed, while the second message not being received is used to determine that the second handshake process is not successfully completed.

In one embodiment, along with the first message, a second timer is started; the second message being received during running of the second timer is used to determine that the second handshake process is successfully completed; the second timer being expired is used to determine that the second handshake process is not successfully completed.

In one embodiment, as a response to the second handshake process being successfully completed, a target process is performed.

In one embodiment, the second receiver 1402 receives a third message; the second transmitter 1401 transmits a fourth message; herein, the first message triggers the third message; the third message triggers the fourth message; and the fourth message triggers the second message; the third message comprises the first message; the fourth message comprises the second message.

In one embodiment, the second transmitter 1401 comprises the antenna 420, the transmitter 418, the multi-antenna transmitting processor 471, the transmitting processor 416, the controller/processor 475 and the memory 476 in FIG. 4 of the present application.

In one embodiment, the second transmitter 1401 comprises the antenna 420, the transmitter 418, the multi-antenna transmitting processor 471 and the transmitting processor 416 in FIG. 4 of the present application.

In one embodiment, the second transmitter 1401 comprises the antenna 420, the transmitter 418 and the transmitting processor 416 in FIG. 4 of the present application.

In one embodiment, the second receiver 1402 comprises the antenna 420, the receiver 418, the multi-antenna receiving processor 472, the receiving processor 470, the controller/processor 475 and the memory 476 in FIG. 4 of the present application.

In one embodiment, the second receiver 1402 comprises the antenna 420, the receiver 418, the multi-antenna receiving processor 472 and the receiving processor 470 in FIG. 4 of the present application.

In one embodiment, the second receiver 1402 comprises the antenna 420, the receiver 418 and the receiving processor 470 in FIG. 4 of the present application.

Embodiment 15

FIG. 15 illustrates a structure block diagram of a processing device used in a third node according to one embodiment of the present application; as shown in FIG. 15. In FIG. 15, a processing device 1500 in a third node comprises a third receiver 1501 and a third transmitter 1502.

The third receiver 1501 receives a handover request message; and the third transmitter 1502 transmits a handover request acknowledge message.

In Embodiment 15, a first signaling is transmitted, the first signaling being used for mobility control, and the first signaling being used for indicating at least a first target cell and a second target cell; a first handshake process is performed, the first handshake process being for the first target cell; and a second handshake process is performed, the second handshake process being for the second target cell; and whether at least one of the first handshake process or the second handshake process is successfully completed is used to determine an RRC connection re-establishment procedure is to be initiated; at least a former one of the first handshake process or the second handshake process is used for a PCell handover; a start time of the first handshake process is no later than a start time of the second handshake process; the action of determining whether to initiate an RRC connection re-establishment procedure according to whether at least one of the first handshake process or the second handshake process is successfully completed comprises: any one of the first handshake process or the second handshake process not being successfully completed is used to determine to initiate the RRC connection re-establishment procedure; at least one of the first handshake process or the second handshake process being successfully completed is used to determine not to initiate the RRC connection re-establishment procedure; the handover request message is used to trigger the handover request acknowledge message; the handover request acknowledge message is used to trigger the first signaling.

In one embodiment, the third transmitter 1502, as a response to the handover request message being received, transmits an SN addition request message; the third receiver 1501, as a response to the SN addition request message being transmitted, receives an SN addition request acknowledge message; herein, the SN addition request acknowledge message is used to trigger the handover request acknowledge message.

In one embodiment, the third receiver 1501 monitors a first radio signal; the third transmitter 1502 determines whether to transmit the second radio signal according to whether the first radio signal is received;

herein, the first radio signal is used to trigger the second radio signal; whether the second radio signal is received is used to determine whether the first handshake process is successfully completed; the second radio signal being received is used to determine that the first handshake process is successfully completed, while the second radio signal not being received is used to determine that the first handshake process is not successfully completed; the first radio signal comprises at least a random access preamble.

In one embodiment, the third receiver 1501 receives a second signaling; the second signaling is used to acknowledge that the PCell handover is successfully completed.

In one embodiment, the third transmitter 1502, as a response to the second signaling being received, transmits a handover success message; the handover success message is used for notifying that the PCell handover is successfully completed.

In one embodiment, the handover success message is used to trigger an SN release request message; the release request message is used to trigger an SN release request acknowledge message; a first field in the SN release request message is used to indicate the PCell handover.

In one embodiment, the second handshake process comprises: a first message being transmitted on the second target cell; as a response to the first message being transmitted, a second message being monitored; whether the second message is received is used to determine whether the second handshake process is successfully completed; the second message being received is used to determine that the second handshake process is successfully completed, while the second message not being received is used to determine that the second handshake process is not successfully completed.

In one embodiment, the third receiver 1501 receives a third message; the third transmitter 1502 transmits a fourth message; herein, the first message triggers the third message; the third message triggers the fourth message; and the fourth message triggers the second message; the third message comprises the first message; the fourth message comprises the second message.

In one embodiment, the third transmitter 1502 comprises the antenna 420, the transmitter 418, the multi-antenna transmitting processor 471, the transmitting processor 416, the controller/processor 475 and the memory 476 in FIG. 4 of the present application.

In one embodiment, the third transmitter 1502 comprises the antenna 420, the transmitter 418, the multi-antenna transmitting processor 471 and the transmitting processor 416 in FIG. 4 of the present application.

In one embodiment, the third transmitter 1502 comprises the antenna 420, the transmitter 418 and the transmitting processor 416 in FIG. 4 of the present application.

In one embodiment, the third receiver 1501 comprises the antenna 420, the receiver 418, the multi-antenna receiving processor 472, the receiving processor 470, the controller/processor 475 and the memory 476 in FIG. 4 of the present application.

In one embodiment, the third receiver 1501 comprises the antenna 420, the receiver 418, the multi-antenna receiving processor 472 and the receiving processor 470 in FIG. 4 of the present application.

In one embodiment, the third receiver 1501 comprises the antenna 420, the receiver 418 and the receiving processor 470 in FIG. 4 of the present application.

Embodiment 16

Figure 16:
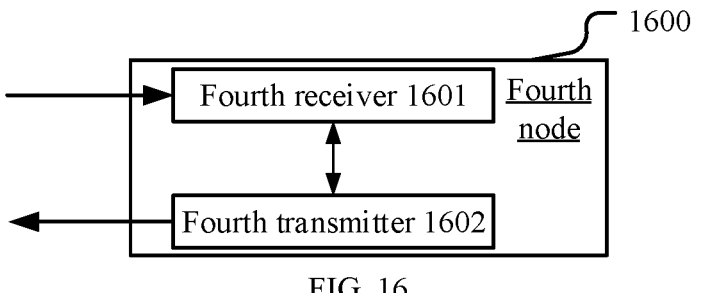
FIG. 16 illustrates a structure block diagram of a processing device used in a fourth node according to one embodiment of the present application.

FIG. 16 illustrates a structure block diagram of a processing device used in a fourth node according to one embodiment of the present application; as shown in FIG. 16. In FIG. 16, a processing device 1600 in a fourth node comprises a fourth receiver 1601 and a fourth transmitter 1602.

The fourth receiver 1601 monitors a first message; and the fourth transmitter 1602 determines whether to transmit a second message according to whether the first message is received.

In Embodiment 16, a first signaling is transmitted, the first signaling being used for mobility control, and the first signaling being used for indicating at least a first target cell and a second target cell; a first handshake process is performed, the first handshake process being for the first target cell; and a second handshake process is performed, the second handshake process being for the second target cell; and whether at least one of the first handshake process or the second handshake process is successfully completed is used to determine an RRC connection re-establishment procedure is to be initiated; at least a former one of the first handshake process or the second handshake process is used for a PCell handover; a start time of the first handshake process is no later than a start time of the second handshake process; the action of determining whether to initiate an RRC connection re-establishment procedure according to whether at least one of the first handshake process or the second handshake process is successfully completed comprises: any one of the first handshake process or the second handshake process not being successfully completed is used to determine to initiate the RRC connection re-establishment procedure; at least one of the first handshake process or the second handshake process being successfully completed is used to determine not to initiate the RRC connection re-establishment procedure; whether the second message is received is used to determine whether the second handshake process is successfully completed; the second message being received is used to determine that the second handshake process is successfully completed, while the second message not being received is used to determine that the second handshake process is not successfully completed.

In one embodiment, a handover request message is used to trigger a handover request acknowledge message; the handover request acknowledge message is used to trigger the first signaling.

In one embodiment, the fourth receiver 1601 receives an SN addition request message; the fourth transmitter 1602, as a response to the SN addition request message being received, transmitting an SN addition request acknowledge message; the handover request message is used to trigger an SN addition request message; the SN addition request acknowledge message is used to trigger the handover request acknowledge message.

In one embodiment, the fourth receiver 1601 receives an SN release request message, where a first field in the SN release request message is used to indicate the PCell handover; the fourth transmitter 1602, as a response to the SN release request message being received, transmitting an SN release request acknowledge message.

In one embodiment, a handover success message is used to trigger the SN release request message; a second signaling is used to trigger the handover success message; the handover success message is used for notifying that the PCell handover is successfully completed; the second signaling is used to acknowledge that the PCell handover is successfully completed.

In one embodiment, the fourth transmitter 1602, as a response to the first message being received, transmits a third message; the fourth receiver 1601, as a response to the third message being transmitted, receives a fourth message; herein, the first message triggers the third message; the third message triggers the fourth message; and the fourth message triggers the second message; the third message comprises the first message; the fourth message comprises the second message.

In one embodiment, the fourth transmitter 1602 comprises the antenna 420, the transmitter 418, the multi-antenna transmitting processor 471, the transmitting processor 416, the controller/processor 475 and the memory 476 in FIG. 4 of the present application.

In one embodiment, the fourth transmitter 1602 comprises the antenna 420, the transmitter 418, the multi-antenna transmitting processor 471 and the transmitting processor 416 in FIG. 4 of the present application.

In one embodiment, the fourth transmitter 1602 comprises the antenna 420, the transmitter 418 and the transmitting processor 416 in FIG. 4 of the present application.

In one embodiment, the fourth receiver 1601 comprises the antenna 420, the receiver 418, the multi-antenna receiving processor 472, the receiving processor 470, the controller/processor 475 and the memory 476 in FIG. 4 of the present application.

In one embodiment, the fourth receiver 1601 comprises the antenna 420, the receiver 418, the multi-antenna receiving processor 472 and the receiving processor 470 in FIG. 4 of the present application.

In one embodiment, the fourth receiver 1601 comprises the antenna 420, the receiver 418 and the receiving processor 470 in FIG. 4 of the present application.

Embodiment 17

Figure 17:
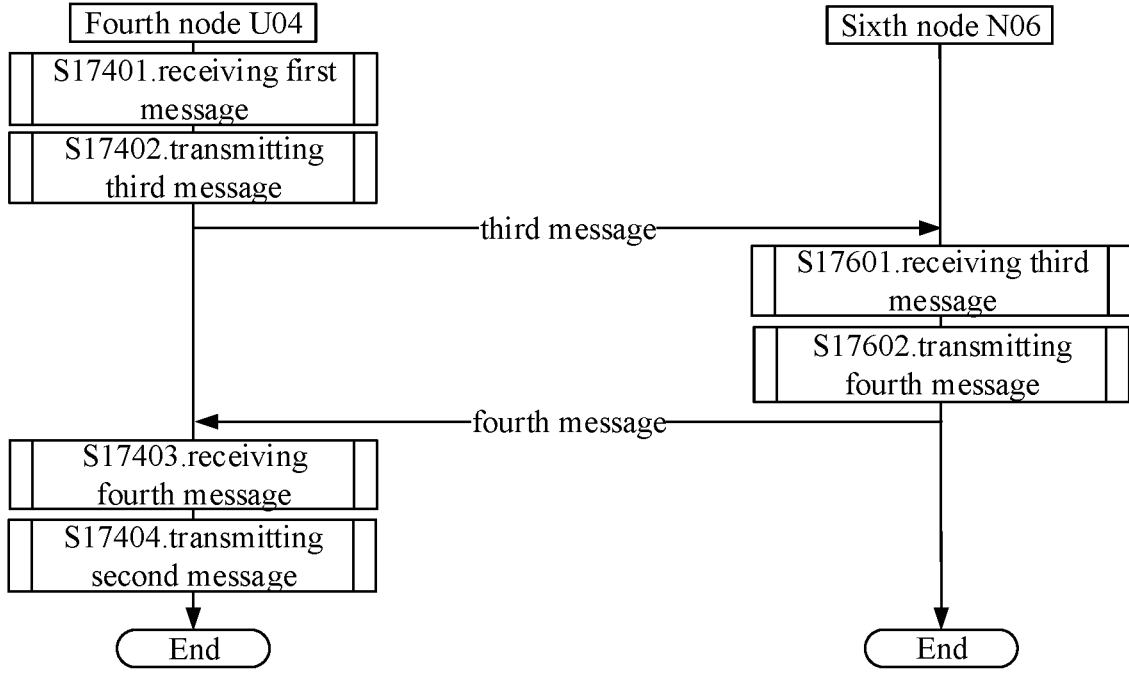
FIG. 17 illustrates a flowchart of a third message and a fourth message according to one embodiment of the present application.

Embodiment 17 illustrates a flowchart of a third message and a fourth message according to one embodiment of the present application, as shown in FIG. 17.

The fourth node U04 receives a first message in step S17401; as a response to the first message being received, transmits a third message in step S17402; and as a response to the third message being transmitted, receives a fourth message in step S17403; and as a response to the fourth message being received, transmits a second message.

The sixth node N06 receives the third message in step S17601; and transmits the fourth message in step S17602.

In Embodiment 17, the first message triggers the third message; the third message triggers the fourth message; and the fourth message triggers the second message; the third message comprises the first message; the fourth message comprises the second message.

In one embodiment, the sixth node N06 is the second node in the present application.

In one embodiment, the sixth node N06 is the third node in the present application.

In one embodiment, a container in the third message comprises the first message.

In one embodiment, a container in the fourth message comprises the second message.

In one embodiment, the third message carries all or part of the first message.

In one embodiment, the fourth message carries all or part of the second message.

In one embodiment, the third message is transmitted via an Xn interface.

In one embodiment, the third message is transmitted via an X2 interface.

In one embodiment, the fourth message is transmitted via an Xn interface.

In one embodiment, the fourth message is transmitted via an X2 interface.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present application includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A user equipment (UE), comprising:
a transceiver; and
a processor, wherein the transceiver and the processor are configured to:
receive signaling that indicates at least a first target cell and a second target cell, and
perform a first handshake process for the first target cell,
perform a second handshake process for the second target cell
initiate a Radio Resource Control (RRC) connection re-establishment procedure in response to at least one of the first handshake process or the second handshake process not being successfully completed, and
determine not initiate the RRC connection re-establishment procedure in response to the first handshake process and the second handshake process being successfully completed.

2. The UE according to claim 1, wherein the transceiver and the processor are further configured to:
transmit a first radio signal on the first target cell, and
monitor a second radio signal on the first target cell, wherein the first radio signal is used to trigger the second radio signal, wherein whether the second radio signal is received is used to determine whether the first handshake process is successfully completed, and wherein the second radio signal being received is used to determine that the first handshake process is successfully completed, while the second radio signal not being received is used to determine that the first handshake process is not successfully completed, and wherein the first radio signal comprises at least a random access preamble.

3. The UE according to claim 1, wherein the second handshake process comprises:
transmitting a first message on the second target cell, and in response to transmitting the first message, monitoring a second message, wherein whether the second message is received is used to determine whether the second handshake process is successfully completed, and wherein the second message being received is used to determine that the second handshake process is successfully completed, while the second message not being received is used to determine that the second handshake process is not successfully completed.

4. The UE according to claim 3, wherein the first message and the second message are both RRC layer signalings, and wherein the first message comprises at least a measurement report.

5. The UE according to claim 3, wherein the first message is a physical layer signaling, and wherein the first message comprises at least a random access preamble.

6. The UE according to claim 3, wherein the first handshake process not being successfully completed is used to trigger the first message.

7. The UE according to claim 1, wherein the transceiver and the processor are further configured to:
in response to the first handshake process being successfully completed, transmit signaling operative to acknowledge that Primary Cell (PCell) handover is successfully completed, wherein the signaling is used to trigger a handover success message, and wherein the handover success message is used for notifying that the PCell handover is successfully completed, and wherein the handover success message is used to trigger a release request message from a secondary node, and wherein the release request message is used to trigger a release request acknowledge message from the secondary node, and wherein a first field in the secondary node's release request message is used to indicate the PCell handover.

8. The UE according to claim 1, wherein the transceiver and the processor are further configured to:

determine that the second handshake process is successfully completed, and in response to determining that the second handshake process is successfully completed, perform a target procedure, wherein performing the target procedure comprises: initiating a first recovery procedure includes transmitting a MCGFailureInformation message, or, suspending all Signaling Radio Bearers (SRBs) and Data Radio Bearers (DRBs) other than an SRB0 in a Master Cell Group (MCG) transmission, or resetting a Medium Access Control (MAC) entity of an MCG.

9. The UE according to claim 1, wherein the transceiver and the processor are configured to:

determine that the second handshake process is successfully completed, and in response to determining the second handshake process is successfully completed, perform a target procedure, wherein performing the target procedure includes: releasing an RRC connection by at least one of entering an RRC_IDLE state, or, resetting a MAC entity, or releasing all radio resources, or, releasing a Radio Link Control (RLC) entity, or releasing a Backhaul Adaptation Protocol (BAP) entity, or releasing MAC configuration and associated Packet Data Convergence Protocol (PDCP) entity and Service Data Adaptation Protocol (SDAP) for all established RBs and Backhaul Radio Link Control (BH RLC) channels.

10. The UE according to claim 1, wherein the transceiver and the processor are further configured to:

determine that the second handshake process is successfully completed, and in response to determining that the second handshake process is successfully completed, perform a target procedure, wherein performing the target procedure includes: suspending an RRC connection by at least one of applying suspendConfig, or, resetting a MAC entity, or, re-establishing an RLC entity of an SRB1, or entering an RRC_INACTIVE state, or, suspending all SRBs other than an SRB0.

11. The UE according to claim 1, wherein the transceiver and the processor are further configured to:

determine that the second handshake process is successfully completed, and in response to determining that the second handshake process is successfully completed, perform a target procedure, wherein performing the target procedure includes performing a handover procedure according to a second message by at least performing reconfiguration with sync according to the second message, or starting a T304 and setting a T304 value to a value of T304 in the second message, or starting synchronization with a downlink of a third target cell, or, applying Broadcast Control Channel (BCCH) configuration of the third target cell, or initiating a random access procedure on the third target cell.

12. The UE according to claim 1, wherein the transceiver and the processor are further configured to:

determine that a second handshake process is successfully completed, and in response to determining that the second handshake process is successfully completed, perform a target procedure, wherein performing the target procedure includes performing a bearer type transforming procedure by at least designating the second target cell as a PCell and designating the first target cell as a Primary SCG Cell (PSCell), or, designating a cell group to which the first target cell belongs as a MCG and designating a cell group to which the second target cell belongs as a Secondary Cell Group (SCG).

13. The UE according to claim 1, wherein the transceiver and the processor are further configured to:

the processor is configured to determine that one of the first handshake process or the second handshake process is not successfully completed, and in response to the RRC connection re-establishment procedure being initiated, transmit a third signaling, receive a fourth signaling, and transmit a fifth signaling, wherein the third signaling, the fourth signaling and the fifth signaling are used for the RRC connection re-establishment procedure, and wherein the third signaling is used for requesting an RRC connection re-establishment, and wherein the third signaling triggers the fourth signaling, and wherein the fourth signaling triggers the fifth signaling.

14. The UE according to claim 1, wherein the transceiver and the processor are further configured to:

in response to receiving the signaling, initiate the first handshake process and the second handshake process.

15. The UE according to claim 1, wherein the transceiver and the processor are further configured to:

in response to a first execution condition and a second execution condition being satisfied, initiate the first handshake process and the second handshake process, wherein the signaling indicates the first execution condition and the second execution condition, the first execution condition being a triggering condition for applying a candidate configuration of the first target cell, and the second execution condition being a triggering condition for applying a candidate configuration of the second target cell.

16. The UE according to claim 1, wherein the first target cell is a target cell for handover, and the second target cell is another target cell for handover.

17. The UE according to claim 1, wherein the first target cell is a target PCell, and the target cell is a target PSCell.

18. The UE according to claim 1, wherein the first target cell is a target PCell, and the target cell is a source PSCell.

19. A base station, comprising:

a transceiver; and a processor, wherein the transceiver and the processor are configured to:

transmit signaling indicating at least a first target cell and a second target cell, wherein a first handshake process is performed for the first target cell, a second handshake process is performed for the second target cell, an RRC connection re-establishment procedure is initiated in response to at least one of the first handshake process or the second handshake process not being successfully completed, and the RRC connection re-establishment procedure is not initiated in response to the first handshake process and the second handshake process being successfully completed.

20. A method, comprising:

receiving signaling that indicates at least a first target cell and a second target cell;

performing a first handshake process for the first target cell;

performing a second handshake process for the second target cell;

initiating an RRC connection re-establishment procedure in response to at least one of the first handshake process or the second handshake process not being successfully completed; and not initiating the RRC connection re-establishment procedure in response to the first handshake process and the second handshake process being successfully completed.

* * * * *